US012786643B2

(12) United States Patent
Eeckhoudt et al.

(10) Patent No.: US 12,786,643 B2
(45) Date of Patent: Nov. 3, 2026

(54) IMPLANTABLE MICROPHONE MANAGEMENT

(71) Applicant: COCHLEAR LIMITED, Macquarie University (AU)

(72) Inventors: Stijn Eeckhoudt, Macquarie University (AU); Jan Vermeiren, Macquarie University (AU); Antonin Rambault, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 262 days.

(21) Appl. No.: 18/689,284

(22) PCT Filed: Sep. 6, 2022

(86) PCT No.: PCT/IB2022/058363

§ 371 (c)(1),
(2) Date: Mar. 5, 2024

(87) PCT Pub. No.: WO2023/031894

PCT Pub. Date: Mar. 9, 2023

(65) Prior Publication Data

US 2025/0133358 A1 Apr. 24, 2025

Related U.S. Application Data

(60) Provisional application No. 63/241,038, filed on Sep. 6, 2021.

(51) Int. Cl.
*H04R 25/00* (2006.01)

(52) U.S. Cl.
CPC ....... *H04R 25/606* (2013.01); *H04R 2225/67* (2013.01)

(58) Field of Classification Search
CPC .... H04R 25/606; H04R 2225/67; H04R 1/08; H04R 2460/13; H04R 1/2853;
(Continued)

(56) References Cited

U.S. PATENT DOCUMENTS

2003/0125602 A1* 7/2003 Sokolich .............. H04R 25/606 600/25
2009/0028356 A1 1/2009 Ambrose et al.
(Continued)

FOREIGN PATENT DOCUMENTS

| | | | |
|---|---|---|---|
| CN | 110891233 | A | 3/2020 |
| KR | 20120068767 | A | 6/2012 |
| WO | 2013163115 | A1 | 10/2013 |

OTHER PUBLICATIONS

Extended European search report for European Patent Application No. 22 863 779.9, mailed May 26, 2025.
(Continued)

*Primary Examiner* — Duc Nguyen
*Assistant Examiner* — Chimezie Ezeriwe Bekee
(74) *Attorney, Agent, or Firm* — Pilloff Passino & Cosenza LLP; Martin J. Cosenza

(57) ABSTRACT

A device including a transducer assembly, and a chamber in which a gas is located such that vibrations originating external to the device based on sound are effectively transmitted therethrough, wherein the device is an implantable microphone, the transducer assembly is in effective vibration communication with the gas, wherein the transducer assembly is configured to convert the vibrations traveling via the gas to an electrical signal, the chamber and the transducer assembly are part of a microphone system of the implantable microphone, wherein the chamber corresponds to a front volume of the microphone system, and the
(Continued)

transducer assembly includes a back volume corresponding to at least part of a back volume of the microphone system.

20 Claims, 32 Drawing Sheets

(58) Field of Classification Search
CPC .... H04R 19/016; A61B 7/00; A61N 1/36032; A61N 1/36036; A61F 2002/183
USPC .......................... 381/151, 324, 326; 181/134
See application file for complete search history.

(56) References Cited

U.S. PATENT DOCUMENTS

| | | | | |
|---|---|---|---|---|
| 2013/0289655 | A1* | 10/2013 | Einberger .......... | A61N 1/36038 607/57 |
| 2015/0249894 | A1 | 9/2015 | Andersson et al. | |
| 2015/0367130 | A1 | 12/2015 | Walraevens et al. | |
| 2015/0382116 | A1 | 12/2015 | Van Gerwen | |
| 2018/0368975 | A1* | 12/2018 | Easter ....................... | A61F 2/18 |
| 2019/0045288 | A1* | 2/2019 | Walraevens ....... | A61N 1/36038 |
| 2020/0084539 | A1 | 3/2020 | Lippert et al. | |
| 2021/0195350 | A1 | 6/2021 | Van den Heuvel et al. | |

OTHER PUBLICATIONS

International Search Report and Written Opinion for PCT/IB2022/058363, mailed Dec. 23, 2022.

* cited by examiner

IMPLANTABLE MICROPHONE MANAGEMENT

CROSS-REFERENCE TO RELATED APPLICATIONS

This application claims priority to U.S. Provisional Application No. 63/241,038, entitled IMPLANTABLE MICROPHONE MANAGEMENT, filed on Sep. 6, 2021, naming Stijn EECKHOUDT of Mechelen, Belgium as an inventor, the entire contents of that application being incorporated herein by reference in its entirety.

BACKGROUND

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In an exemplary embodiment, there is a device, comprising a transducer assembly, and a chamber in which a gas is located such that vibrations originating external to the device based on sound are effectively transmitted therethrough, wherein the device is an implantable microphone, the transducer assembly is in effective vibration communication with the gas, wherein the transducer assembly is configured to convert the vibrations traveling via the gas to an electrical signal, the chamber and the transducer assembly are part of a microphone system of the implantable microphone, wherein the chamber corresponds to a front volume of the microphone system, and the transducer assembly includes a back volume corresponding to at least part of a back volume of the microphone system, and the implantable microphone is configured to purposely enable pressure equalization of the front volume with another volume within the implantable microphone in real time and/or within a time period substantially faster than tolerance leakage between the front volume and the another volume via a route that bypasses a back volume of the microphone system.

In an exemplary embodiment, there is a device, comprising: a transducer assembly, and a chamber in which a gas is located such that vibrations originating external to the device based on sound are effectively transmitted therethrough, wherein the device is an implantable microphone, the transducer assembly is in effective vibration communication with the gas, wherein the transducer is configured to convert the vibrations traveling via the gas to an electrical signal, the chamber and the transducer assembly are part of a microphone system of the implantable microphone, wherein the chamber corresponds to a front volume of the microphone system, and the transducer assembly includes a back volume corresponding to at least part of a back volume of the microphone system, and the device is configured to transfer gas between the chamber and a volume outside the transducer assembly, the volume outside the transducer assembly being a fixed volume.

In an exemplary embodiment, there is a method, comprising capturing at a first temporal location first sound originating external to a recipient with an implanted microphone system implanted in the recipient while the implanted microphone system has a first transfer function, subsequent to the first temporal location, at a second temporal location, experiencing a first event that causes the first transfer function to change to a second transfer function different from the first transfer function, and during a first temporal period beginning after the first temporal location, while continuing to experience the first event, automatically changing the transfer function of the microphone system at least back towards the first transfer function by transferring gas between a front volume of the microphone system and another volume that is greater than the back volume of the discrete transducer assembly and at least 5 times greater than the front volume.

In an embodiment, there is an implantable microphone, comprising a microphone transducer assembly including a transducer housing and a transducer diaphragm, a housing containing the microphone transducer assembly, a pressure sensitive diaphragm, the pressure sensitive diaphragm being exposed to an ambient environment of the implantable microphone, a manifold including a chamber in which a gas is located such that vibrations originating external to the device based on sound are effectively transmitted therethrough, the chamber being bounded in part by the pressure sensitive diaphragm, wherein the transducer diaphragm is located at an end of a passage of the chamber so that the transducer diaphragm is in effective vibration communication with the gas, wherein the transducer microphone assembly is configured to convert the vibrations traveling via the gas into an electrical signal, the chamber and the transducer microphone assembly are part of a microphone system of the implantable microphone, wherein the chamber corresponds to a front volume of the microphone system, and the transducer microphone assembly includes a back volume established by the transducer housing and the transducer diaphragm, the back volume corresponding to at least part of a back volume of the microphone system, and a porous gasket and/or a micropassage connect the front volume with a volume of the housing containing the microphone to purposely enable pressure equalization of the front volume with the volume of the housing containing the microphone in real time and/or within a time period substantially faster than tolerance leakage between the front volume and the another volume via a route that bypasses a back volume of the microphone system.

BRIEF DESCRIPTION OF THE DRAWINGS

Embodiments of the present invention are described below with reference to the attached drawings, in which.

DETAILED DESCRIPTION

Figure 1:
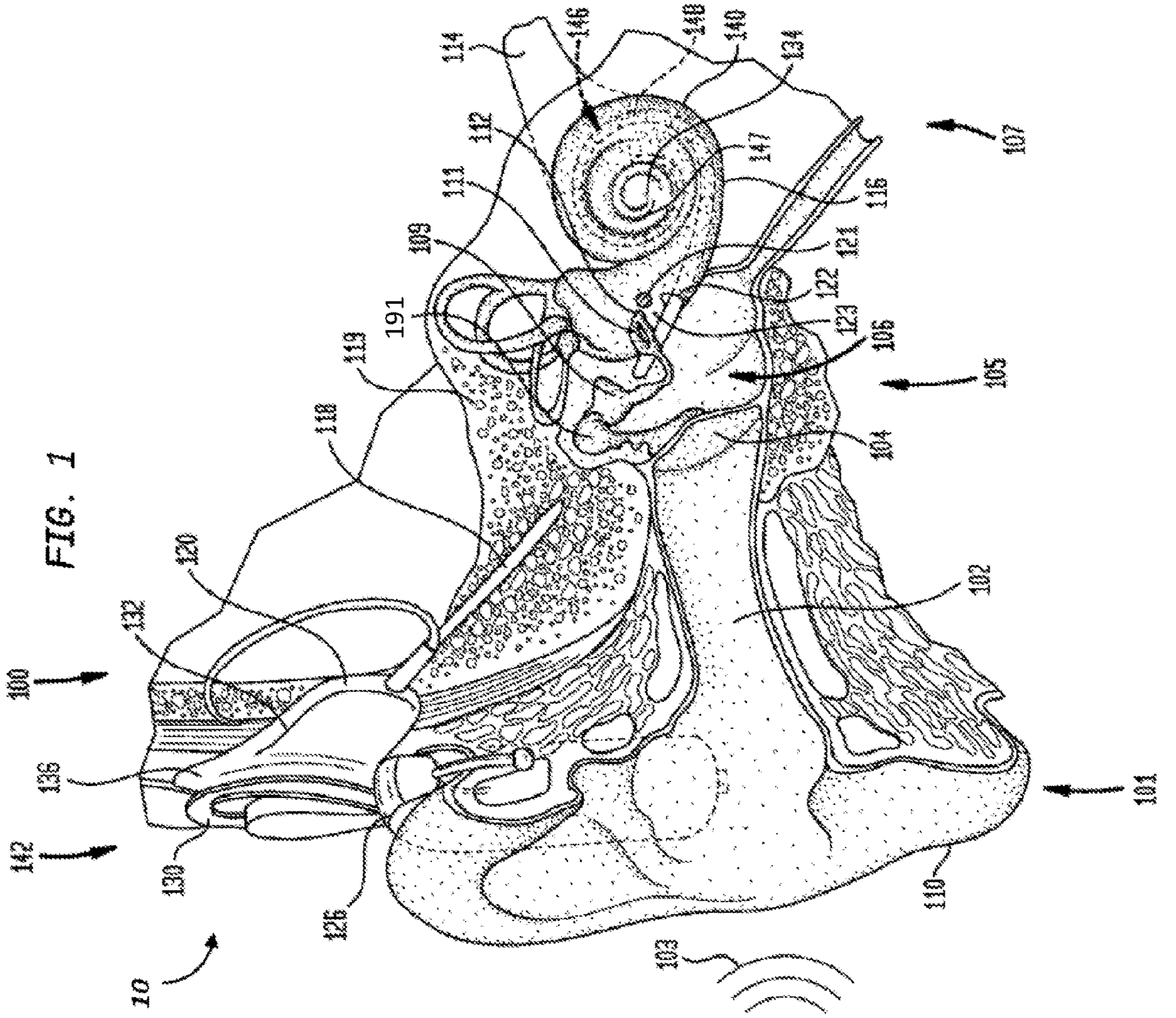
FIG. 1 is a perspective view of an exemplary hearing prosthesis in which at least some of the teachings detailed herein are applicable.

Merely for ease of description, the techniques presented herein are described herein with reference by way of background to an illustrative medical device, namely a cochlear implant. However, it is to be appreciated that the techniques presented herein may also be used with a variety of other medical devices that, while providing a wide range of therapeutic benefits to recipients, patients, or other users, may benefit from setting changes based on the location of the medical device. For example, the techniques presented herein may be used to determine the viability of various types of prostheses, such as, for example, a vestibular implant and/or a retinal implant, with respect to a particular human being. And with regard to the latter, the techniques presented herein are also described with reference by way of background to another illustrative medical device, namely a retinal implant. The techniques presented herein are also applicable to the technology of vestibular devices (e.g., vestibular implants), visual devices (i.e., bionic eyes—the microphones can be used to track sound and thus direct eye tracking potentially), sensors, pacemakers, drug delivery systems, defibrillators, functional electrical stimulation devices, catheters, seizure devices (e.g., devices for monitoring and/or treating epileptic events), sleep apnea devices, electroporation, etc.

The teachings detailed herein are implemented in sensory prostheses, such as hearing implants specifically, and neural stimulation devices in general. Other types of sensory prostheses can include retinal implants. Accordingly, any teaching herein with respect to a sensory prosthesis corresponds to a disclosure of utilizing those teachings in/with a hearing implant and in/with a retinal implant, unless otherwise specified, providing the art enables such. Moreover, with respect to any teachings herein, such corresponds to a disclosure of utilizing those teachings with all of or parts of a cochlear implant, a bone conduction device (active and passive transcutaneous bone conduction devices, and percutaneous bone conduction devices) and a middle ear implant, providing that the art enables such, unless otherwise noted. To be clear, any teaching herein with respect to a specific sensory prosthesis corresponds to a disclosure of utilizing those teachings in/with any of the aforementioned hearing prostheses, and vice versa. Corollary to this is at least some teachings detailed herein can be implemented in somatosensory implants and/or chemosensory implants. Accordingly, any teaching herein with respect to a sensory prosthesis corresponds to a disclosure of utilizing those teachings with/in a somatosensory implant and/or a chemosensory implant.

Thus, merely for ease of description, the first illustrative medical device is a hearing prosthesis. Any techniques presented herein described for one type of hearing prosthesis or any other device disclosed herein corresponds to a disclosure of another embodiment of using such teaching with another device (and/or another type of hearing device including other types of bone conduction devices (active transcutaneous and/or passive transcutaneous), middle ear auditory prostheses (particularly, the EM vibrator/actuator thereof), direct acoustic stimulators), etc. The techniques presented herein can be used with implantable/implanted microphones (where such is a transducer that receives vibrations and outputs an electrical signal (effectively, the reverse of an EM actuator), whether or not used as part of a hearing prosthesis (e.g., a body noise or other monitor, whether or not it is part of a hearing prosthesis) and/or external microphones. The techniques presented herein can also be used with vestibular devices (e.g., vestibular implants), sensors, seizure devices (e.g., devices for monitoring and/or treating epileptic events, where applicable), and thus any disclosure herein is a disclosure of utilizing such devices with the teachings herein (and vice versa), providing that the art enables such. The teachings herein can also be used with conventional hearing devices, such as telephones and ear bud devices connected MP3 players or smart phones or other types of devices that can provide audio signal output, that use an EM transducer. Indeed, the teachings herein can be used with specialized communication devices, such as military communication devices, factory floor communication devices, professional sports communication devices, etc.

By way of example, any of the technologies detailed herein which are associated with components that are implanted in a recipient can be combined with information delivery technologies disclosed herein, such as for example, devices that evoke a hearing percept, to convey information to the recipient. By way of example only and not by way of limitation, a sleep apnea implanted device can be combined with a device that can evoke a hearing percept so as to provide information to a recipient, such as status information, etc. In this regard, the various sensors detailed herein and the various output devices detailed herein can be combined with such a non-sensory prosthesis or any other nonsensory prosthesis that includes implantable components so as to enable a user interface, as will be described herein, that enables information to be conveyed to the recipient, which information is associated with the implant.

FIG. 1 is perspective view of a totally implantable cochlear implant, referred to as cochlear implant 100, implanted in a recipient, to which some embodiments detailed herein and/or variations thereof are applicable. The totally implantable cochlear implant 100 is part of a system 10 that can include external components, in some embodiments, as will be detailed below. It is noted that the teachings detailed herein are applicable, in at least some embodiments, to any type of hearing prosthesis having an implantable microphone.

It is noted that in alternate embodiments, the teachings detailed herein and/or variations thereof can be applicable to other types of hearing prostheses, such as, for example, bone conduction devices (e.g., active transcutaneous bone conduction devices), Direct Acoustic Cochlear Implant (DACI) etc., middle ear implants, etc. Embodiments can include any type of hearing prosthesis that can utilize the teachings detailed herein and/or variations thereof. It is further noted that in some embodiments, the teachings detailed herein and/or variations thereof can be utilized other types of prostheses beyond hearing prostheses.

The recipient has an outer ear 101, a middle ear 105, and an inner ear 107. Components of outer ear 101, middle ear 105, and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 191, the incus 109, and the stapes 111. Bones 191, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to the cochlear implant, where the implanted cochlear implant includes a battery that is recharged by the power provided from the external device 142. In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand or multi-strand platinum or gold wire. External device 142 also includes a magnet (not shown) positioned within the turns of wire of external coil 130. It should be appreciated that the external device shown in FIG. 1 is merely illustrative, and other external devices may be used with embodiments of the present invention.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown, but details of such an exemplary embodiment are described below) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement. Some additional details associated with the implantable microphone assembly 137 will be detailed below.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments electrode assembly 118 may be implanted at least in basal region 116, and sometimes further. For example, electrode assembly 118 may extend towards apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

As noted, cochlear implant 100 comprises a totally implantable prosthesis that is capable of operating, at least for a period of time, without the need for external device 142. Therefore, cochlear implant 100 further comprises a rechargeable power source (not shown) that stores power received from external device 142. The power source can comprise, for example, a rechargeable battery. During operation of cochlear implant 100, the power stored by the power source is distributed to the various other implanted components as needed. The power source may be located in main implantable component 120, or disposed in a separate implanted location.

Figure 2:
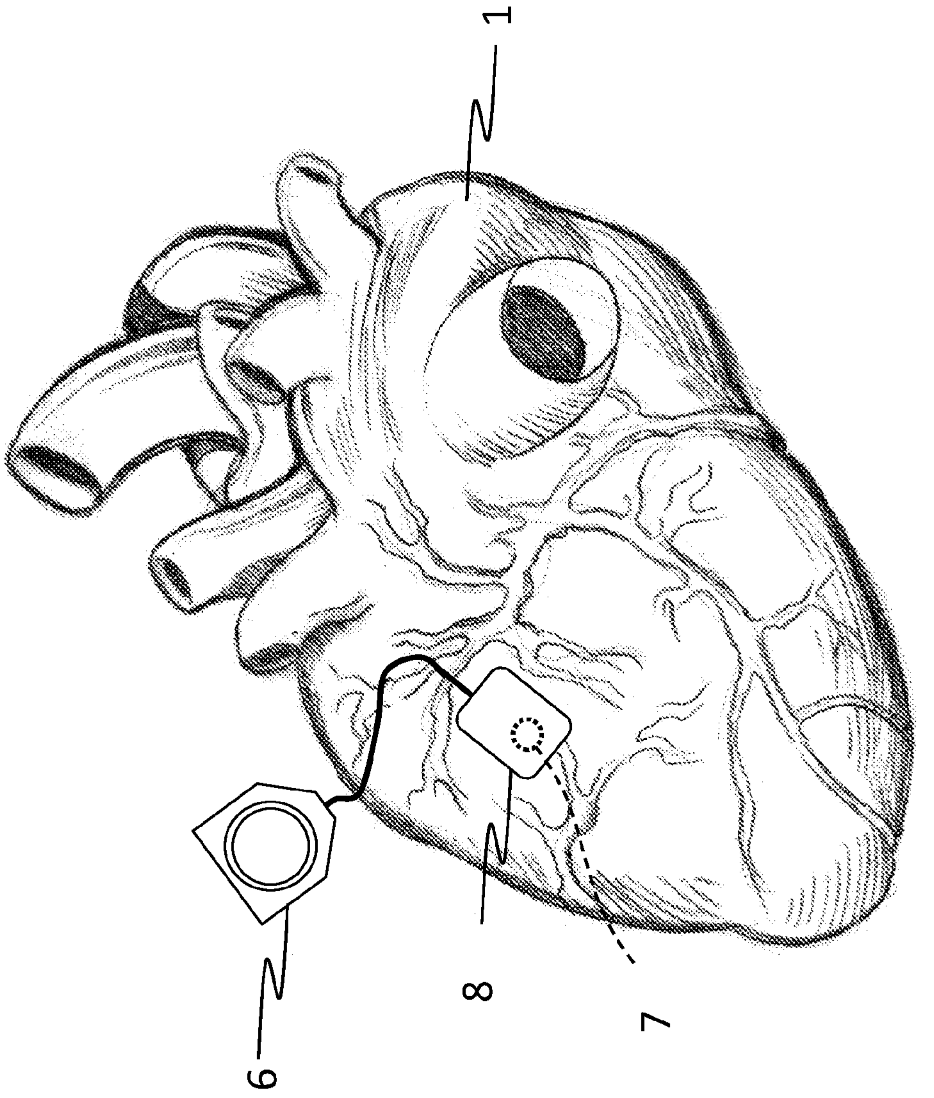
FIG. 2 is a perspective view of an exemplary heart monitor in which at least some of the teachings detailed herein are applicable.

FIG. 2 shows another embodiment in which the teachings herein can be used. Shown is a human heart 1 and an implantable microphone system proximate the heart. Here, there is a diaphragm 7 attached to the housing 8 of the implantable microphone system. The diaphragm 7 shown in—lines because the diaphragm is pointing towards the heart 1. This embodiment is utilized to "listen" to the heart and detect heart murmurs and/or to monitor blood flow through the heart, opening and closing of valves, etc. Hence the diaphragm 7 faces towards the heart 1 and thus away from the surface of the overlying skin, in contrast to some of the other embodiments detailed herein where the implantable microphone system is used as part of a hearing prosthesis. An inductance coil assembly 5 is in electrical cable signal communication with the housing 8. In an exemplary embodiment, the inductance coil assembly 5 can be located away from the heart, such as on the outside of the rib cage, so that an external component can be placed in the signal communication with the inductance coil assembly 6. In an exemplary embodiment, the memory device can be located in the housing 8 to store data obtained from the implanted transducer inside the housing (not shown, but the details of which can correspond to those below), thus enabling periodic data uploads, in contrast to requiring an external device to be constantly located on the recipient.

Implanted microphones can detect pressure in some embodiments. In at least some embodiments, they are configured to detect air pressure which is subsequently transmitted through the tissue to the microphone. Implanted microphones can detect other pressures presented to their surface, which can be undesirable in certain circumstances. One type of pressure which can represent an impairment to the performance of an implanted microphone is pressure due to acceleration. In some embodiments, such acceleration can have a deleterious effect on a hearing prosthesis if it is in the desired operational frequency range of the prosthesis, typically 20 Hz to 20 kHz, although narrower ranges still give satisfactory speech intelligibility. Accelerations may arise from, for example, foot impact during walking, motion of soft tissue relative harder tissues, wear of harder tissues against each other, chewing, and vocalization.

In some embodiments, the accelerations induce pressure on the microphone, which cannot distinguish the desired pressure due to external sounds from the largely undesired pressure due to internal vibration originating directly from the body, or borne to the microphone through the body from an implanted actuator.

In some instances, there can be utilitarian value to reducing signal outputs due to acceleration. Because the relative body-borne to air-borne pressure of an implanted microphone is typically 10-20 dB higher than that that occurs in normal hearing, body originating sounds can be louder relative to externally originating sound. Such large ratios of vibration to acoustic signals are experienced by a recipient as banging and crashing during movement, very noisy chewing, and their own voice being abnormally loud relative to other speakers. At the same time, it should be noted that there is utilitarian value in avoiding the cancellation of all or part of the recipient's own voice.

An exemplary embodiment that includes an implantable microphone assembly utilizes a motion sensor to reduce the effects of noise, including mechanical feedback and biological noise, in an output response of the implantable microphone assembly. In an exemplary embodiment, the diaphragm of the implantable microphone assembly that vibrates as a result of waves traveling through the skin of the recipient originating from an ambient sound, can be also affected by body noise and the like. To actively address non-ambient noise sources (e.g., body noise conducted through tissue of a recipient to a microphone, which in at least some embodiments is not of an energy lever and/or frequency to be audible at a location away from the recipient, at least not without sound enhancement devices) of vibration of the diaphragm of the implantable microphone and thus the resulting undesired movement between the diaphragm and overlying tissue, some embodiments utilize a motion sensor to provide an output response proportional to the vibrational movement experienced by the microphone assembly. In an exemplary embodiment, the motion sensor is substantially isolated from the receipt of the ambient acoustic signals originating from an ambient sound that pass transcutaneously through the tissue over the microphone/diaphragm of the microphone and which are received by the microphone diaphragm. In this regard, the motion sensor can provide an output response/signal that is indicative of motion (e.g., caused by vibration and/or acceleration), whereas a transducer of the microphone can generate an output response/signal that is indicative of both transcutaneously received acoustic sound and motion. Accordingly, the output response of the motion sensor can be removed from the output response of the microphone to reduce the effects of motion on the implanted hearing system.

Figure 3:
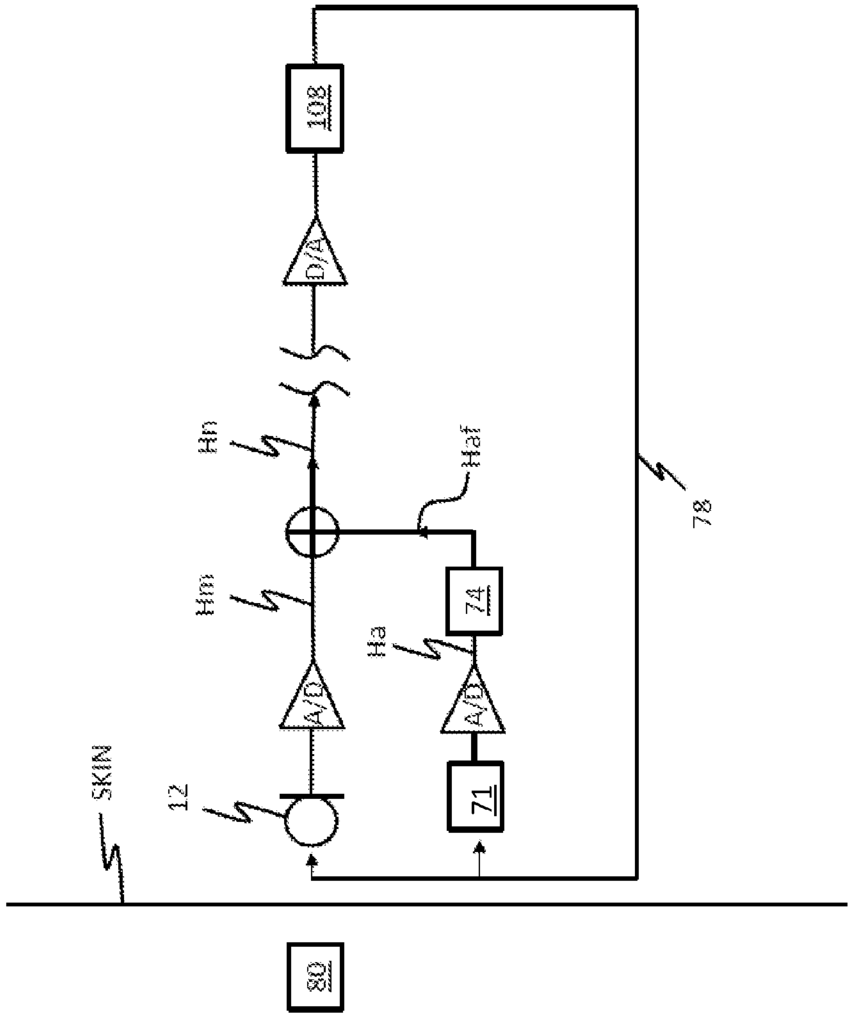
FIG. 3 schematically illustrates an implantable hearing system that incorporates an implantable microphone assembly and motion sensor 71.
Figure 4:
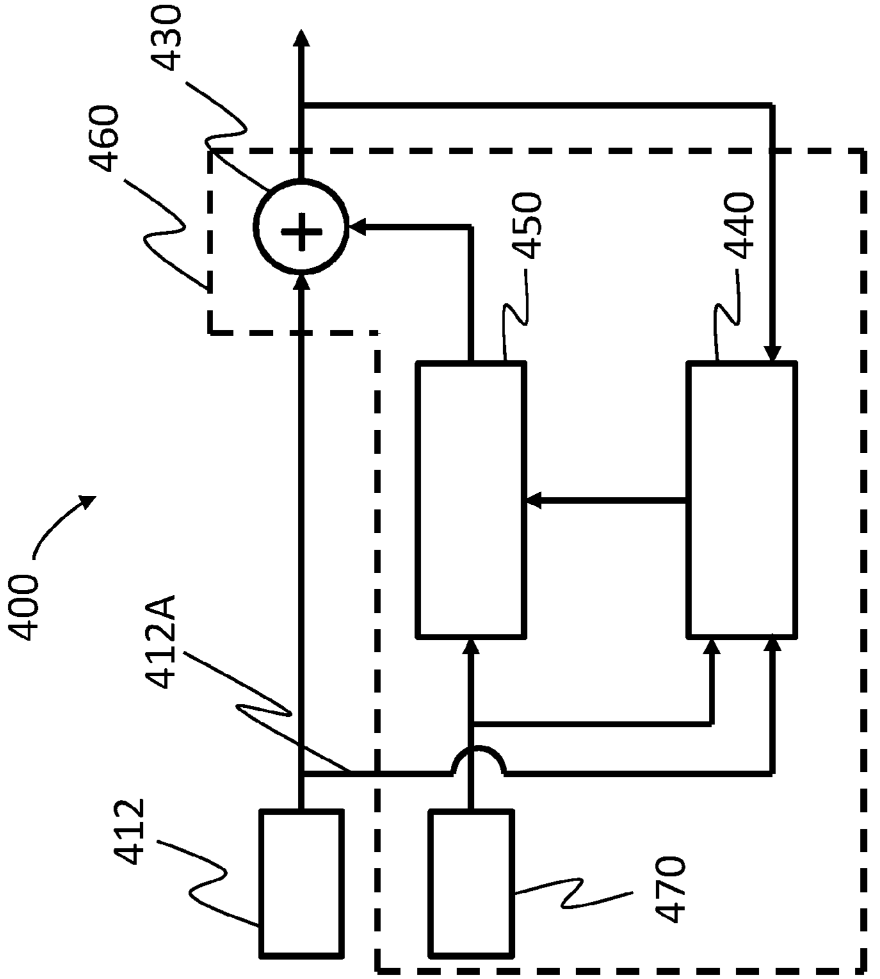
FIG. 4 functionally depicts another exemplary embodiment of a system that is usable in the hearing prosthesis of FIG. 1.
Figure 5:
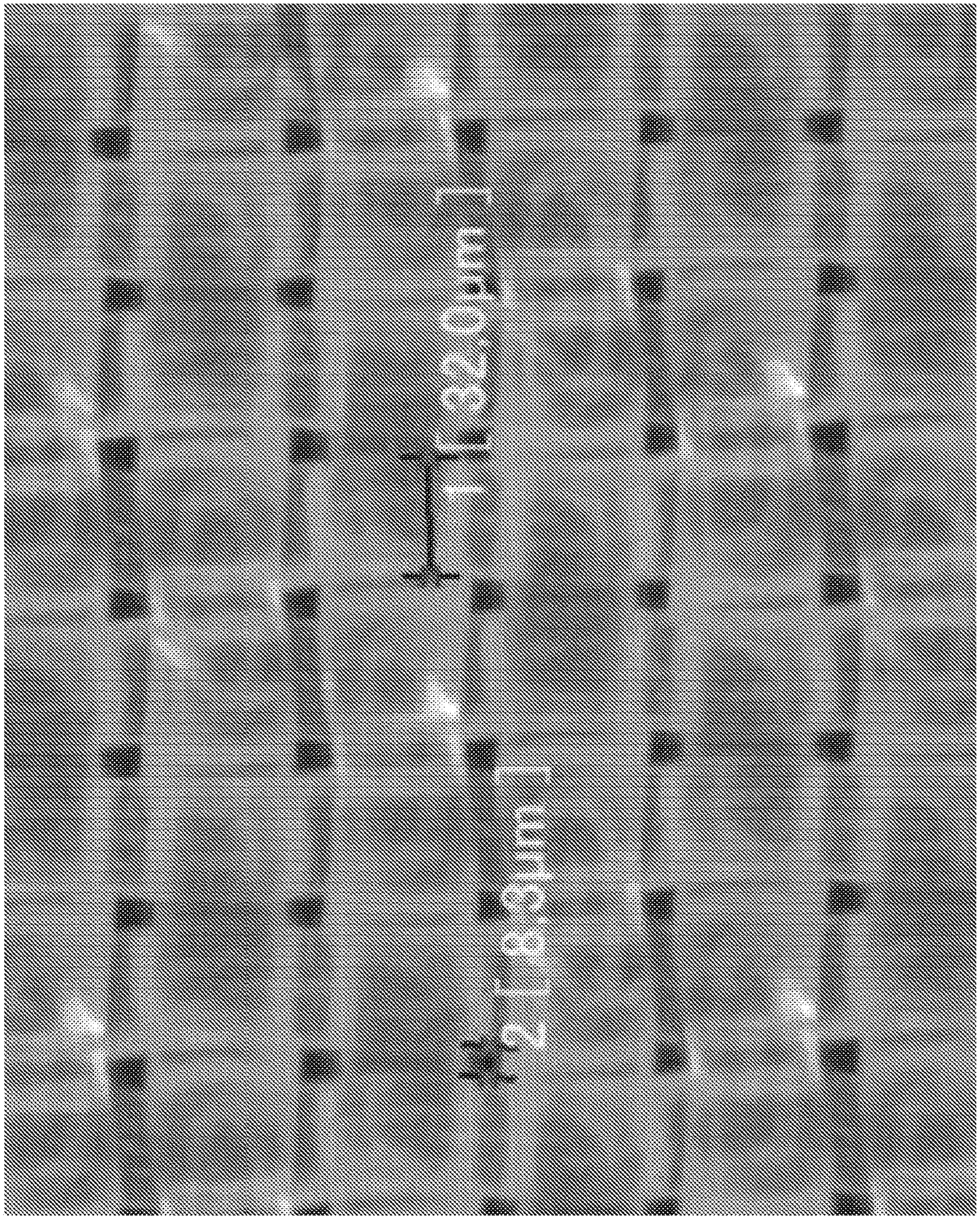
FIGS. 5-8 present some exemplary porous elements used in some embodiments.
Figure 6:
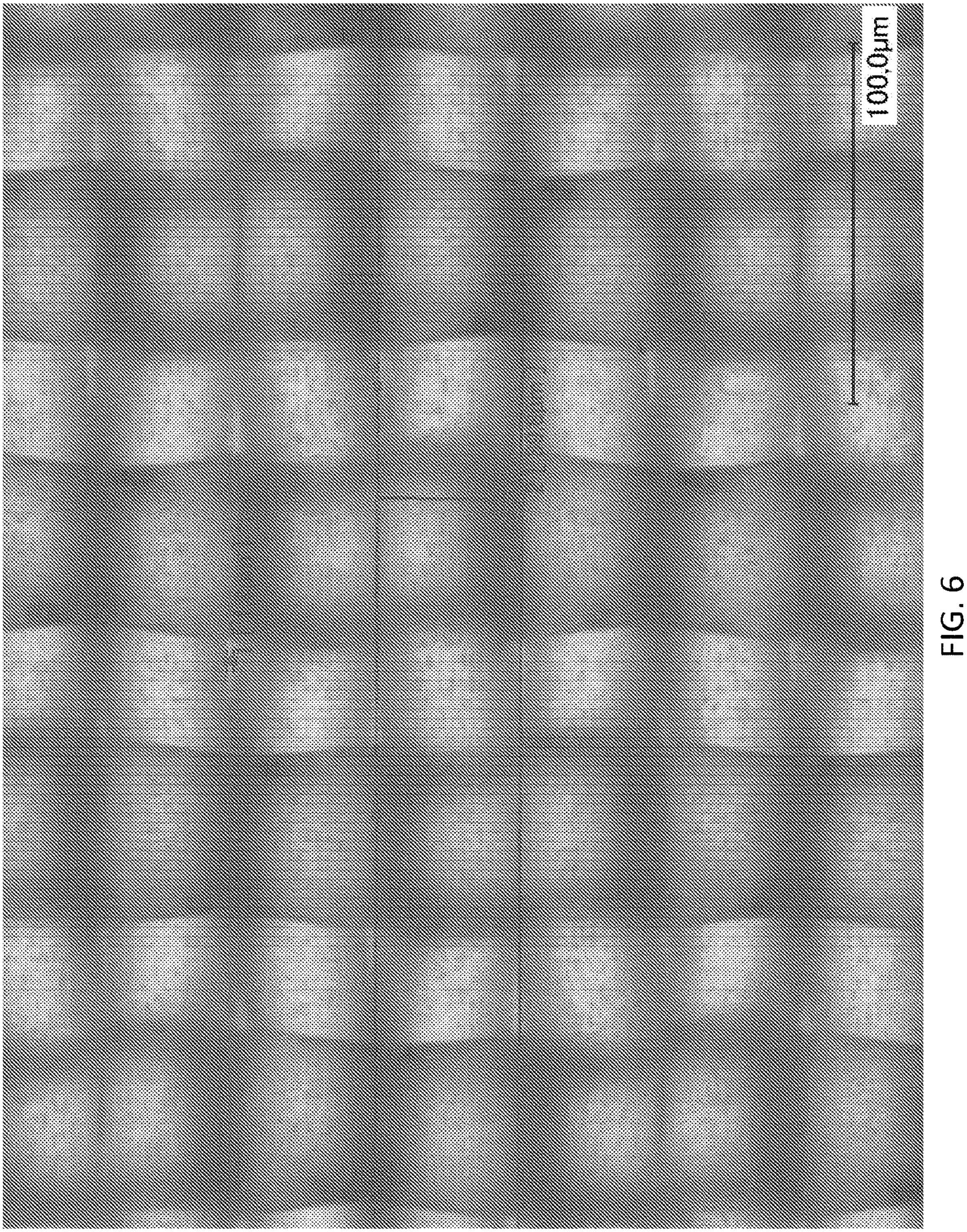
Figure 7:
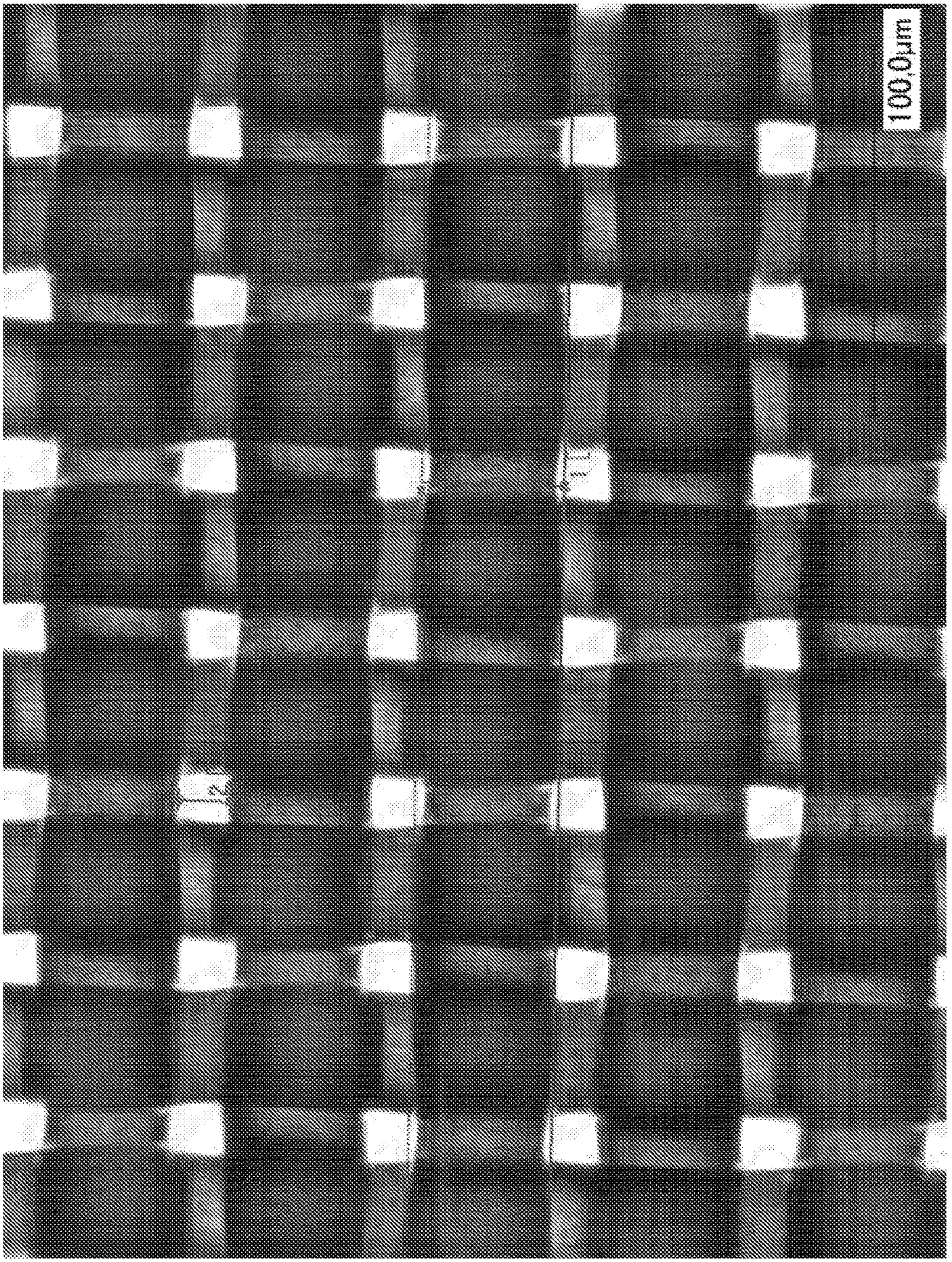
Figure 8:
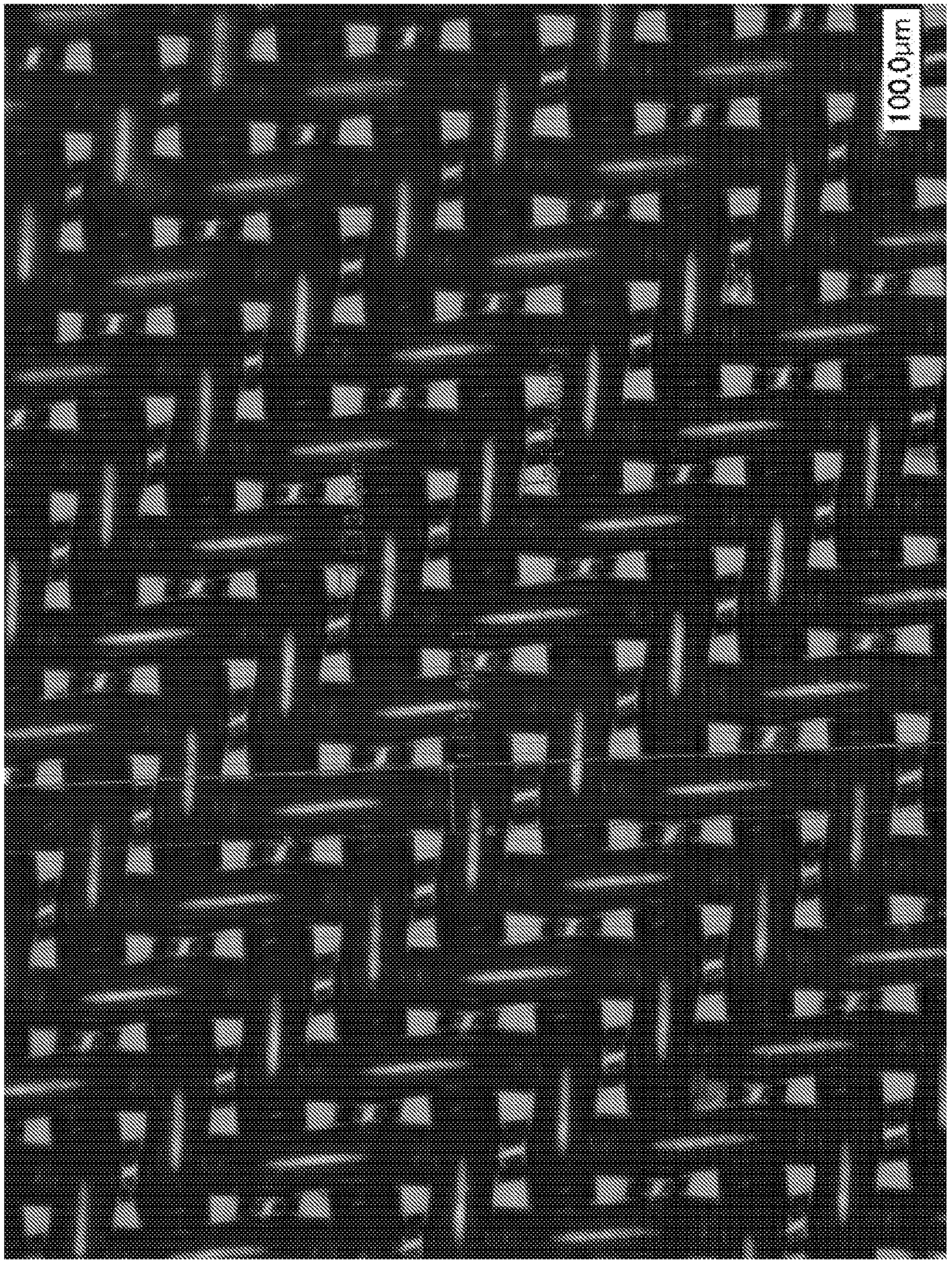

Accordingly, to remove noise, including feedback and biological noise, it is utilitarian to measure the acceleration of the microphone assembly. FIG. 3 schematically illustrates an implantable hearing system that incorporates an implantable microphone assembly having a microphone 12 including a diaphragm and motion sensor 71. As shown, the motion sensor 71 further includes a filter 74 that is utilized for matching the output response Ha of the motion sensor 71 to the output response Hm of the microphone 12. Of note, the diaphragm of microphone 12 is subject to desired acoustic signals (i.e., from an ambient source 103), as well as undesired signals from biological sources (e.g., vibration caused by talking, chewing etc.) and, depending on the type of output device 108 (e.g., bone conduction vibratory apparatus, DACI actuator, and, in some instances, cochlear implant electrode array) feedback from the output device 108 received by a tissue feedback loop 78. In contrast, the motion sensor 71 is substantially isolated (which includes totally isolated) from the ambient source and is subjected to only the undesired signals caused by the biological source and/or by feedback received via the feedback loop 78. Accordingly, the output of the motion sensor 71 corresponds the undesired signal components of the microphone 12. However, the magnitude of the output channels (i.e., the output response Hm of the microphone 12 and output response Ha of the motion sensor 71) can be different and/or shifted in phase. In order to remove the undesired signal components from the microphone output response Hm, the filter 74 and/or the system processor can be operative to filter one or both of the responses to provide scaling, phase shifting and/or frequency shaping. The output responses Hm and Ha of the microphone 12 and motion sensor 71 are then combined by summation unit 76, which generates a net output response Hn that has a reduced response to the undesired signals.

In order to implement a filter 74 for scaling and/or phase shifting the output response Ha of a motion sensor 71 to remove the effects of feedback and/or biological noise from a microphone output response Hm, a system model of the relationship between the output responses of the microphone 12 and motion sensor 71 is identified/developed. That is, the filter 74 can be operative to manipulate the output response Ha of the motion sensor 71 to biological noise and/or feedback, to replicate the output response Hm of the microphone 12 to the same biological noise and/or feedback. In this regard, the filtered output response Haf and Hm may be of substantially the same magnitude and phase prior to combination (e.g., subtraction/cancellation). However, it will be noted that such a filter 74 need not manipulate the output response Ha of the motion sensor 71 to match the microphone output response Hm for all operating conditions. Rather, the filter 74 can match the output responses Ha and Hm over a predetermined set of operating conditions including, for example, a desired frequency range (e.g., an acoustic hearing range) and/or one or more pass bands. Note also that the filter 74 can accommodate the ratio of microphone output response Hm to the motion sensor output response Ha to acceleration, and thus any changes of the feedback path which leave the ratio of the responses to acceleration unaltered have little or no impact on good cancellation. Such an arrangement thus can have significantly reduced sensitivity to the posture, clenching of teeth, etc., of the recipient.

An exemplary process for generating a filter usable in an embodiment can be found in a system discussed in U.S. Patent Application Publication No. 20120232333 and/or according to any utilitarian methodology. Further details of noise cancellation implementation that can be used in some embodiments are found in US Patent Application Publication No. 2015/0256949 published on Sep. 10, 2015, naming Filiep J. Vanpoucke as an inventor. In this regard, at least some embodiments include devices, systems and/or methods that utilize one or more or all of the teachings of U.S. Patent Application Publication No. 2015/0256949 and/or U.S. Patent Application Publication No. 20120232333 in combination with one or more or all of the teachings detailed herein.

Figure 9:
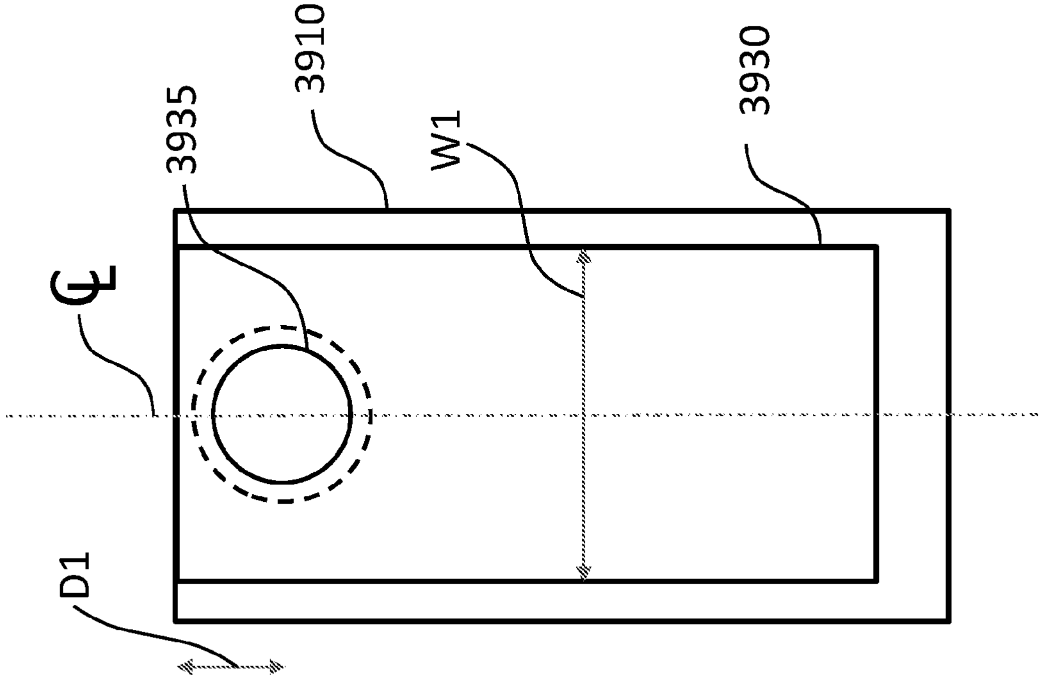

FIG. 9 depicts a system 400 used in some embodiments. As can be seen, there is a direct signal route 412A from the microphone 412 to the filter control unit 440. Thus, the system 400' in general, and control unit 440 in particular, is configured to compare or otherwise evaluate the raw outputs of a microphone 412 and an accelerometer 470 and identify the presence of an own voice body event based on these raw outputs. That said, in an alternate embodiment, the outputs can be amplified and/or otherwise signal processed between the transducers and the control unit, or after the control unit, etc. In an embodiment of the system 400, the control unit 440 is configured such that it receives outputs from the transducers simultaneously without cancellation, even in the presence of noise cancellation. (Conversely, in some embodiments, the control unit 440 could simultaneously receive outputs from both the transducers without cancellation, but only in the absence of the noise cancellation. Still, in at least some embodiments, because the amount of cancellation resulting from the signal having passed through adder 430 is known, the output of microphone 412 without cancellation can be calculated by simply "adding" the equivalent of the canceled signal back into the signal that is received by the filter control unit 440 that originates downstream of the adder 430.)

In an exemplary embodiment of the system 400, the system is configured to compare a parameter that is related to transduced energy originating from the acoustic signal to a parameter related to transduced energy originating from the body noise. The system is further configured to identify the presence (and thus identify the absence) of an own of voice event based on the comparison. Some additional details of such an exemplary embodiment are described below.

The system 400 is configured to cancel body noise energy from signal(s) output by the transducer system 480 that includes energy originating from the aforementioned acoustic signal (the ambient noise signal 103). In an exemplary embodiment, this cancellation of body noise is executed by the system 400 during some modes of operation, such as a mode of operation in which the system operates in the absence of an identification by the aforementioned control unit of an identification of the presence of the own voice body noise event. That is, in an exemplary embodiment, the system 400 is configured to alternately cancel body noise energy from the transducer signal depending on a mode of operation. In this regard, if the system 400, via the control unit 440, does not identify the presence of an own voice event and/or identifies the absence of an own voice event, the system operates to cancel body noise. (In an exemplary embodiment, it operates to cancel body noise according to the adaptive methods, systems, and/or devices detailed herein and/or variations thereof.) Element 450 is an adjustable filter apparatus 450 controlled by control unit 440 that runs an adaptive algorithm to control the filter(s) of the adjustable filter apparatus 450. That said, this does not exclude the cancellation of body noise energy from the transducer signal during the mode of operation where the control unit identifies the presence of an own voice body noise event, although in some embodiments, the system is so configured such that cancellation of body noise energy from the transducer signal is suspended during such a mode of operation. Collectively, the accelerometer 470, the adjustable filters 450, the filter control unit 440, and the adder 430 corresponds to an adaptive noise cancellation sub-system 460. Further details of variations of the embodiment of FIG. 9 are found in US Patent Application Publication No. 2015/0256949 published on Sep. 10, 2015, naming Filiep J. Vanpoucke as an inventor, which can be used in some embodiments of the teachings below.

Figure 11:
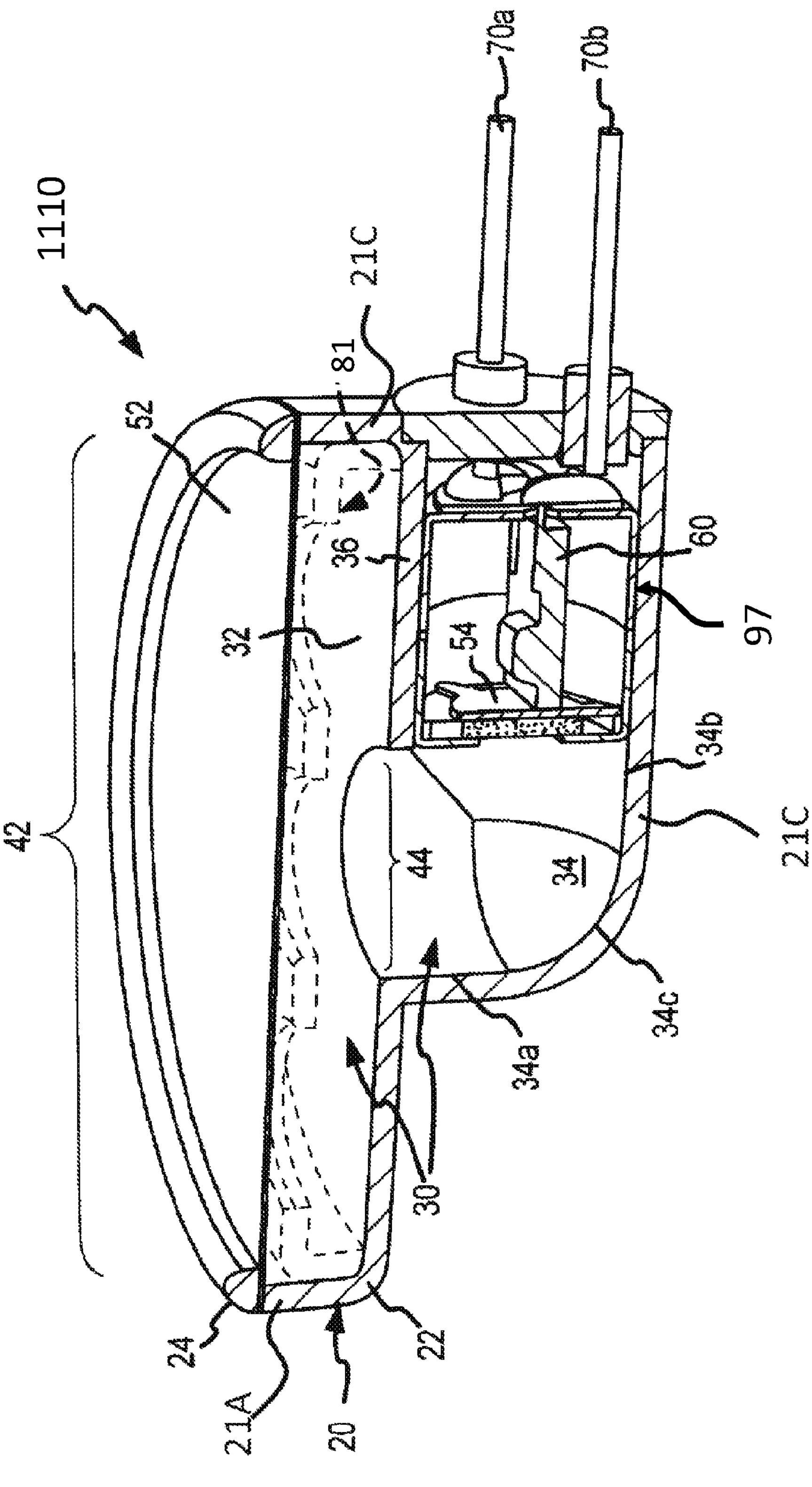
FIGS. 11-13 depict some exemplary teachings associated with a microphone that are usable in some embodiments.

FIG. 11 depicts a cross-sectional view of an exemplary implantable microphone 1110, which can correspond to microphone 12/412 above. The microphone 1110 includes a housing 20 that defines an internal chamber 30. The chamber 30 has an aperture 42 across which a first diaphragm 52 is sealably disposed. Housing 20 includes a base member 22 and a peripheral member 24 defining the aperture 42. The peripheral edge of the first diaphragm 52 is fixedly interconnected between the base member 22 and peripheral member 24 of the housing 20 (e.g., via laser welding). The peripheral member 24 and the diaphragm 52 are the two components of the microphone 1110.

The diaphragm 52 can be welded to the housing 20. This weld can establish a hermetic seal between the exposed portions of the microphone 1110 such that the interior of the microphone is hermetically sealed from the ambient environment.

Figure 12:
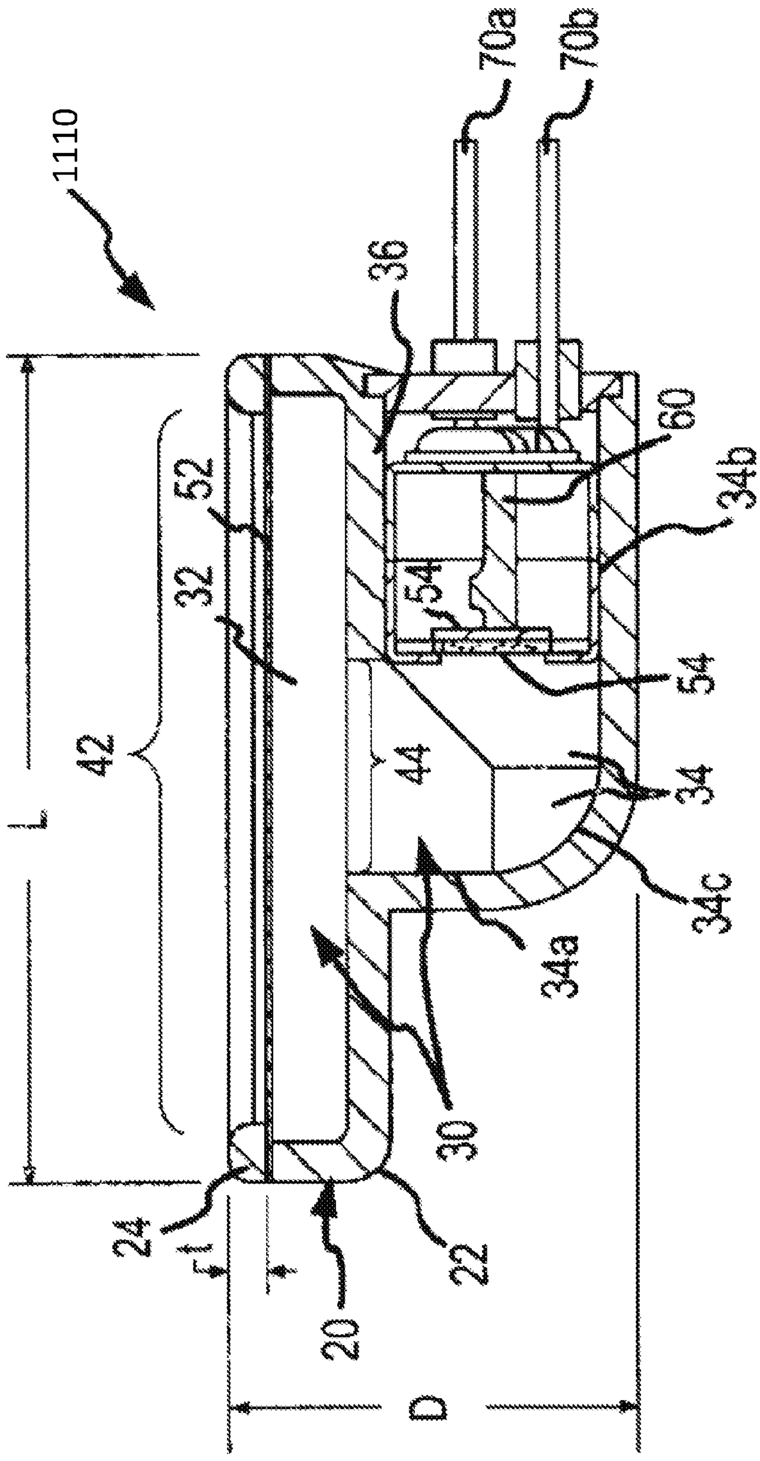

Referring now to FIG. 12, the first diaphragm 52 is recessed relative to the outer peripheral member 24. In this regard, in at least some exemplary embodiments there is utilitarian value if the first diaphragm 52 is recessed a distance t relative to the outer rim of peripheral member 24. In an exemplary embodiment, t is greater than 0.5 mm and/or less than 1.0 mm.

As illustrated in FIGS. 11 and 12, internal chamber 30 can be provided to include a first portion 32 and a second portion 34. The first portion 32 is disposed adjacent to the first diaphragm 52. The second portion 34 adjoins and extends away from the first portion 32 at an opening 44 therebetween and about an axis that is transverse to the first diaphragm 52 and aperture 42. As shown, opening 44 can be of a reduced cross-sectional area relative to aperture 42.

In the microphone 1110, the second internal chamber portion 34 can be of L-shaped configuration, wherein the second portion 34 comprises a first leg 34*a* that extends away from the first internal chamber portion 32 about an axis that is substantially perpendicular to a center plane of the first diaphragm 52. The second internal chamber portion 34 further includes a second leg 34*b* interconnected to the first leg 34*a* at a rounded elbow 34*c*.

Aperture 42 and opening 44 can each be of a circular configuration and can each be aligned about a common center axis. Correspondingly, such common center axis can be aligned with a center axis for first diaphragm 52 which can also be of a circular shape. Further, the first internal chamber portion 32 and first leg 34*a* of the second internal chamber portion 34 can each be of a cylindrical configuration, and can each be aligned on the same center axis as aperture 42 and opening 44. The second leg 34*b* of the second portion 34 of chamber 32 can be disposed to extend substantially perpendicularly from the first leg 34*a* of the second portion 34. As such, it can be seen that the second leg 34*b* may share a wall portion 36 with the first portion 32 of the internal chamber 30.

As shown in FIGS. 11 and 12, there is a second diaphragm 54 that is disposed at the interface between the first leg 34*a* and second leg 34*b* of the second chamber portion 34. More particularly, the second diaphragm 54 can be provided at a port of a conventional hearing aid (corresponding to microphone element 60) which is disposed within the second leg 34*b* of the second chamber portion 34. In this regard, microphone element 60 can comprise an electret transducer in the form of an electret condenser microphone. In this regard, the second diaphragm 54 can be provided as part of the conventional hearing aid microphone. Microphone element 60 can be provided with electrical power and control signals and may provide an electrical output signal, each of which signals are carried by corresponding signal lines 70*a*, 70*b* or 70*c*. Collectively, components 54 and 60 and the support structure therefore form a transducer microphone element assembly 97.

In use, the microphone 10 can be surgically implanted in the mastoid region of a patient, wherein the aperture 42 and the first diaphragm 52 are positioned immediately adjacent to and facing the skin of the patient. Upon receipt of vibrations traveling through the skin of the recipient resulting from an acoustical signal impinging upon the outside of the recipient's skin as a result of an ambient noise, first diaphragm 52 will vibrate to act upon the enclosed volume within chamber 30 and thereby pass the vibration from one side of the first diaphragm 52 (the outside) into the chamber 30 such that it is communicated by the medium therein and received by the second diaphragm 54.

Upon receipt of vibrational energy traveling through internal chamber 30 originating from movement of the diaphragm 52 and impinging upon the second diaphragm 54, the microphone element 60 converts the energy impinging thereupon into an electrical signal for output via one of the signal lines 70*a*, 70*b* or 70*c*. In turn, such output signal can be further conditioned and/or directly transmitted to a sound processor or the like of the hearing prosthesis of which the microphone 10 is apart.

The housing 20 and first diaphragm 52 can be constructed from biocompatible materials. In particular, titanium and/or biocompatible titanium-containing alloys may be utilized for the construction of such components. With particular respect to the first diaphragm 52 in an exemplary embodiment, the material utilized and thickness thereof can be such that it yields resonant frequency above about 3.5 kHz when mechanically loaded by tissue, wherein the resonance has, in at least some embodiments no greater than about a 20 dB excursion. Further, attenuation effects of the first diaphragm 52 can be, in at least some embodiments, more than 10 dB from about 250 Hz to 5.5 kHz. By way of example, first diaphragm 52 can comprise titanium, and may be of a flat, disk-shaped configuration having a thickness of between about 5 to about 20 microns. In an exemplary embodiment, there is a diaphragm having a 10 or 15 micron thickness that is under tension of about 400 N/m. However, in an alternate embodiment, the first diaphragm 52 is instead a plate, such as a titanium plate, having a thickness of more than 20 microns. In an exemplary embodiment, the diaphragm (or plate) has a material utilized and thickness thereof is such that it yields resonant frequency above about 9, 10, 11, 12, 13, 14, 15 or more kHz when mechanically loaded by tissue. In an exemplary embodiment, when element 52 is a plate, the plate can have a thickness of less than or equal to about 200 microns (in some embodiments, there is no tension on the plates). In an exemplary embodiment, there is a plate having a thickness of about 100 microns or less, or a plate having a thickness of about 32 microns or less. In an exemplary embodiment, the spring rate of the diaphragm is relatively small compared to the spring rate of the fluid inside the chamber. This results in the pressure loading being coupled to the microphone diaphragm in a relatively complete manner, rather than some of the force from the external pressure being supported by the diaphragm 52 and the housing 20 whereby the pressure loading can be lost.

Figure 13:
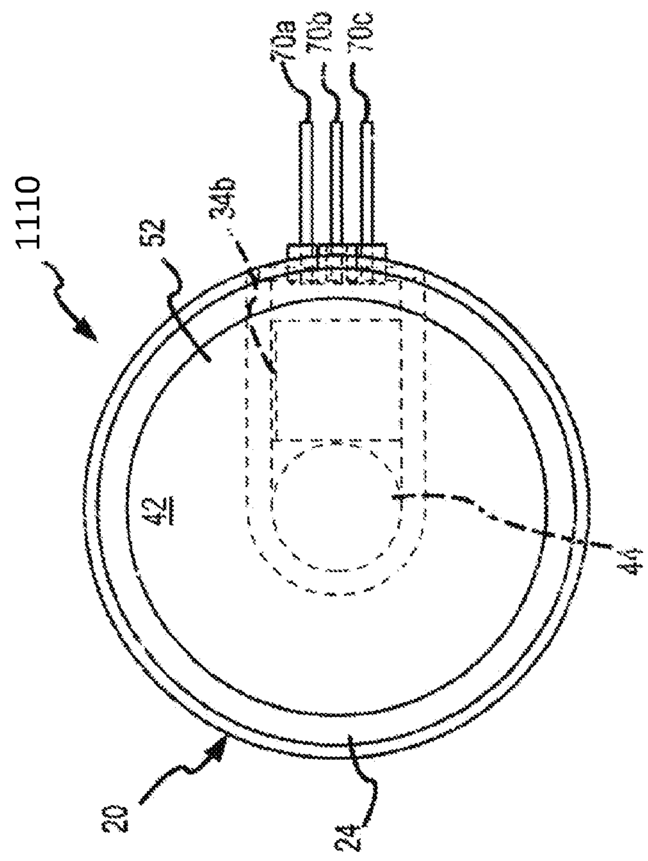

In an exemplary embodiment, there is a support member 81 that is located within the first portion 32 of the internal chamber 30 of housing 20, as is depicted by the phantom lines in FIG. 11. FIG. 13 depicts a top view of the microphone 1110.

Figure 14:
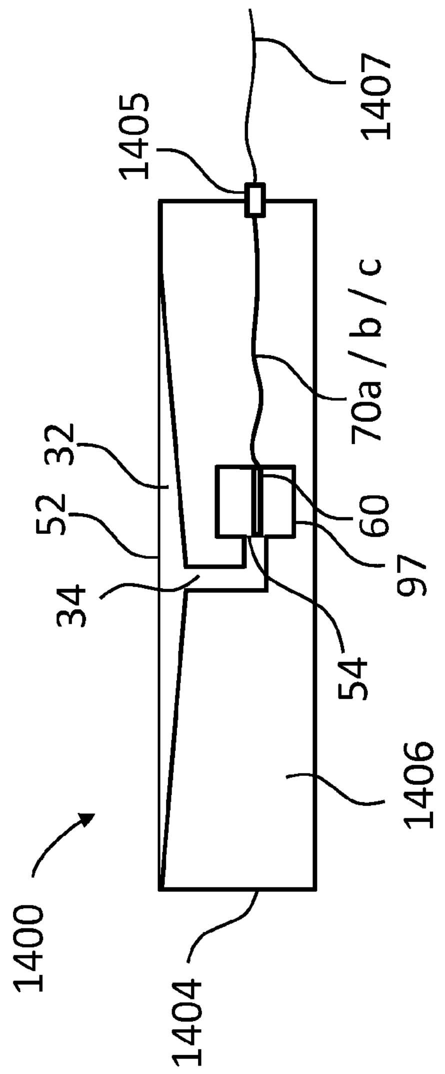
FIG. 14 depicts an exemplary embodiment in which some teachings herein can be utilized.

Microphone 1110 can be an integral part of an implanted unit, such as the implantable component 100. In an exemplary embodiment, the unit includes the microphone and a receiver-stimulator of a cochlear implant, a signal processor (sound processor) and/or other components. It is further noted that in alternative embodiments, the microphone 1110 can be located within the recipient at a location remote from the unit that includes the receiver-stimulator. That is, in an exemplary embodiment, microphone 1110 can be a separate, self-contained unit in signal communication with the unit that includes the receiver-stimulator, where the latter can also contain a signal processor (sound processor) and/or other components, the microphone 1110 being in signal communication with the remote unit via electrical leads, etc. An exemplary embodiment of a separate, self-contained microphone is seen in FIG. 14, depicting microphone 1400 (additional details will be discussed below). In such an exemplary embodiment, additional housing components might be utilized with microphone 1110 to achieve the functionality afforded by a self-contained unit hermetically enclosing portions of the microphone 1110 that might not be hermetically enclosed according to the configuration of FIG. 11 (although in other embodiments, the configuration of FIG. 11 presents a hermetic enclosure with respect to at least the components establishing the outline of the microphone 1110 presented therein—where communication cables 70*a* and 70*b* can lead to feedthroughs hermetically connected to the housing 20 and/or can be hermetically sealed at junctions passing into the housing, the microphone element 60, etc.). Any implanted placement of the microphone 1110 that can enable the microphone 1110 to be utilitarianly utilized according to the teachings detailed herein and/or variations thereof can be utilized in at least some embodiments.

FIG. 14 depicts a self-contained microphone 1400 that provides a framework from which embodiments can be described below. The microphone of FIG. 14 in some embodiments, includes some or more or all of the features of the microphone 1110 detailed above in at least some exemplary embodiments. Indeed, in an exemplary embodiment, any disclosure herein of a microphone can include one or more or all of the features of microphone 1100. Like reference numbers have been utilized. This microphone can correspond to the microphone 12 above. As can be seen, the upper chamber 32 in this embodiment is conical shaped/funnel shaped, and the lower chamber 34 which leads from the throat of the funnel dog legs to the transducer microphone element assembly 97. Signal lines 70*a, b,* and *c* lead to a feedthrough 1405 which in turn is connected to an electrical lead 1407 which is configured to be connected to a remote unit which can include a sound processor or the like. A connector (not shown) can be located at the end of lead 1407 to enable the microphone 1400 to be removably connected to the remote unit that includes the signal processor and also place the microphone 1402 why communication there with. A housing 1404 encloses the interior of the microphone 1400 and supports the diaphragm 52 directly or indirectly as the case may be. The feedthrough 1405 is part of a system that establishes a hermetically sealed interior 1406, which is hermetically isolated from the environment in which the microphone 1400 can be located (e.g., implanted inside a human beneath the skin thereof).

In view of the above, it can be seen that embodiments can use an implanted/implantable microphone that employs a flexible diaphragm responsive to acoustic signals (outside sounds) that has a hermetic seal which prevents ingress of gas or liquid into the microphone enclosure. The diaphragm transmits pressure waves (compression and/or rarefaction) into the microphone enclosure, causing changes (which can be rapid) in pressure within a defined volume (the "front volume"—the volume established at least by chambers 32 and 34). These changes in pressure are detected in turn by a microphone element 60 located on an opposite side of a diaphragm 54 relative to the front volume) and so disposed as to face the front volume with its acoustically sensitive side. On the opposite side of the diaphragm 54 relative to the front volume is another defined volume (the "back volume"), which serves as an acoustic compliance area allowing the diaphragm 54 to deflect and detect sound from the front volume. The microphone element 60 is coupled to this diaphragm (directly or indirectly), and, in some embodiments, is connected to signal-processing circuitry (e.g., on a printed circuit board assembly, or "PCBA") and sealed to a partition in which it is mounted so as to prevent transmission of gas or working fluid from one side to the other, around the microphone. It is noted that the microphone element can be located anywhere within the back volume that can allow it to perceive pressure variations, or otherwise detect sound, etc.

In some embodiments, there can be fluid transfer between the front volume and the back volume in response to barometric changes in which increased pressure on the external surface of the diaphragm 52 causes the diaphragm 52 to deflect inward, thus increasing pressure in the front volume, and ultimately forcing gas from the front volume to the back volume (and vice versa). This can happen because, in some embodiments, there are one or more pinhole(s) in the diaphragm 54 (sometimes by design), or because the seal around the diaphragm or other components establishing the boundary between the front volume and the back volume is not perfectly sealed (sometimes by design). To be clear, in at least some exemplary embodiments, such as those where the transducer microphone element assembly 97 is an off-the-shelf component, such as with respect to utilizing a MQM 31692 Knowles microphone as element 97, available from the Knowles microphone company, and there is no perfect seal between what is the back volume of that microphone and the front volume. Other microphones can be used, such as comparable microphones (e.g., those that will output an output that is effectively the same as that which would result from this microphone for the same given input), microphones of similar size (e.g., applicable for implantable devices, as opposed to larger microphones), microphones that have a back volume of about the same size. Some embodiments have a seal/prevent fluid transfer between the front volume and the back volume.

Barometric changes in which increased or decreased pressure on the external surface of the diaphragm 52 causes the diaphragm 52 to deflect inward or outward, respectively, thus increasing or decreasing pressure respectively in the front volume. This can change the transfer function of the microphone system, which can thus detract from the utilitarian value of the microphone system. Prior attempts to address this phenomenon can be seen in FIGS. 15 and 16.

Figure 15:
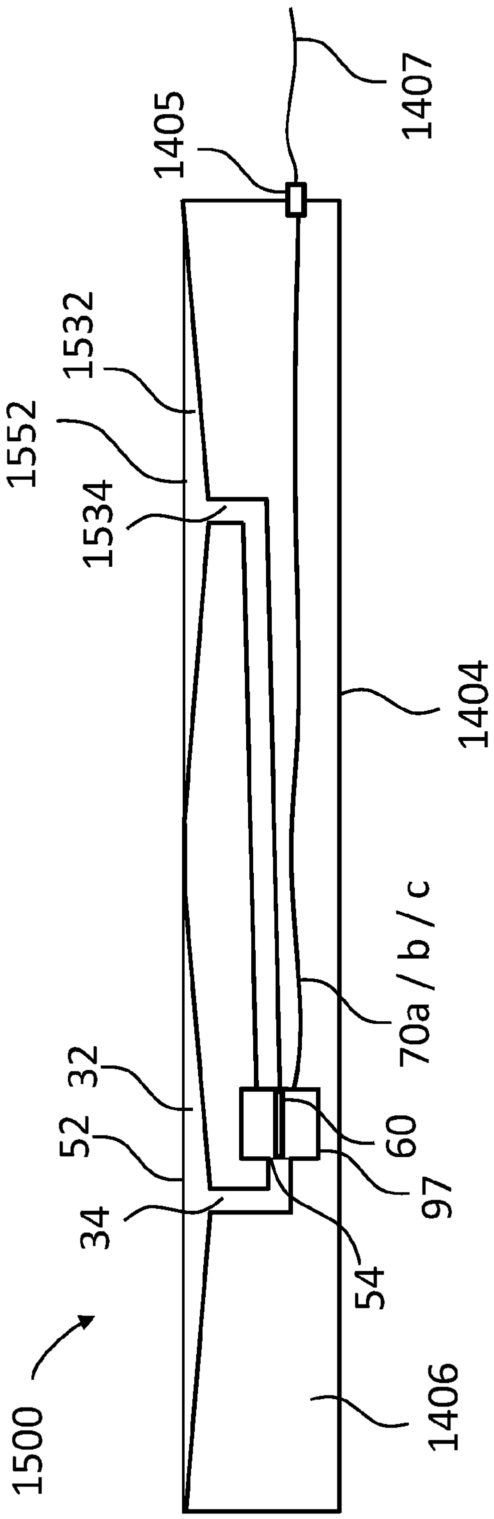
FIGS. 15 and 16 depict some exemplary concepts of attempts to account for pressure changes.

FIG. 15 presents an exemplary implantable microphone unit 1500 that is configured to be removably attached to another unit implanted in a recipient, such as the unit that includes a signal processor, via electrical lead 1407. This microphone unit can correspond to microphone 12 above. In this embodiment, there is a second diaphragm 1552 that is exposed to the ambient environment (the diaphragm 52 being the first diaphragm exposed to the ambient environment) that extends over a first chamber 1532 that leads to a second chamber 1534. In an exemplary embodiment, at least components 1552 and 1532 are similar to or the same as components 52, 32, respectively, in some or all aspects. The interface between chamber 1534 and 1532 and the initial portion of chamber 1534 can also be the same as the interface of chamber 34 with chamber 32 and the initial portion of chamber 34.

In at least some exemplary embodiments of the embodiment of microphone 1500, any change in barometric pressure that changes the static deflection of diaphragm 52 will also change the static deflection of diaphragm 1552. In at least some exemplary embodiments, this will be results in a pressure change in the back volume (the volume that includes chambers 1532 and 1534) that is similar to and/or the same as the pressure change that occurs in the front volume (the volume that includes chambers 32 and 34). In an exemplary embodiment, this will mitigate (reduce and/or eliminate) any differences in pressure between the front volume and back volume that will have the above noted effects on the acoustic property of the microphone.

In this embodiment, the chamber and the transducer correspond to a microphone system, wherein the chamber corresponds to a front volume of the microphone system, and the transducer includes a back volume corresponding to the back volume of the microphone system, again, as is detailed above. It is noted that the back volume 1534 is contiguous with the inside of the transducer microphone element assembly 97 (which established part of the back volume, in combination with back volume 1534 and 1532).

Figure 16:
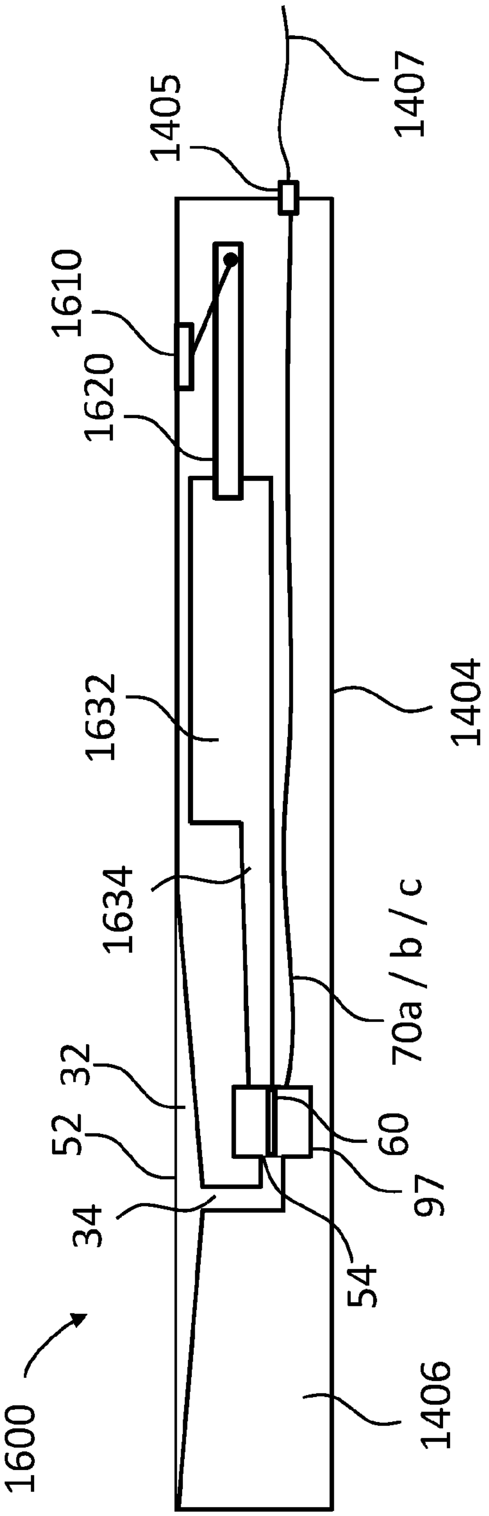

FIG. 16 depicts another exemplary embodiment of an implantable microphone that is configured to enable a volumetric size change of the back volume at a location outside of the transducer. More particularly, FIG. 16 presents the implantable microphone 1600, where the back volume is established by a chamber 1632 and 1634. Unlike chamber 1532 of the embodiment of FIG. 15, chamber 1632 is not bounded by a diaphragm that is exposed to the ambient environment of the implantable microphone 1600. Instead, chamber 1632 is established by solid walls that generally do not deflect (at least not enough to influence the pressure inside the back volume in a meaningful way). Instead, chamber 1632 includes an opening through which piston 1620 can extend and retract. More particularly, piston 1620 is connected to actuator 1610 which is configured to insert and retract piston 1620 when controlled by the implantable microphone or another component so as to adjust the pressure in the back volume to account for a change in pressure of the front volume such as the change in pressure that results from a change in barometric pressure. FIG. 16 depicts the piston 1620 in a retracted state. The actuator 1610 is configured to locate the piston 1620 at various degrees of insertion into the chamber 1632 to obtain various pressure changes in chamber 1632, and thus the back volume. A seal extends about the piston 1620 and is located between the piston 1620 and the walls of the chamber 1632 to establish an airtight seal.

Figure 17:
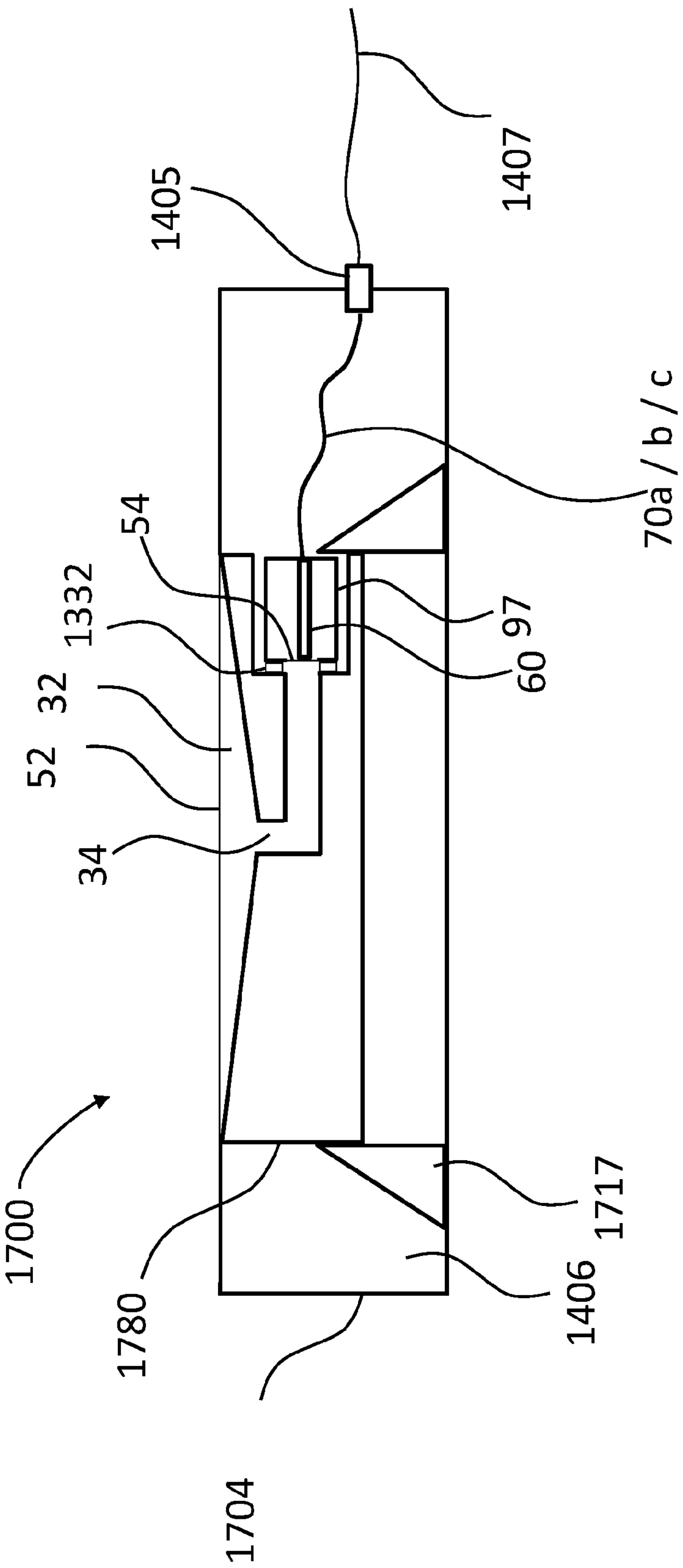
FIGS. 17-29 depict some exemplary embodiments in which some teachings herein can be utilized.

FIG. 17 presents an exemplary embodiment that is different than that disclosed in FIGS. 15 and 16, but which can be used with the arrangements of FIGS. 15 and 16, but also without. In this regard, the invention of this patent application corresponds to the embodiments of FIG. 17 and the figures thereafter. Any means-plus-function claims relating to the implant as a whole correspond to the structure of FIG. 17 and/or the figures thereafter, and FIGS. 5-10. It is noted that some exemplary embodiments of the invention utilize the structure and/or function of the teachings detailed above. And embodiments of the implants according to the invention can include one or more of the above-noted structures and/or functions and/or can include methods that include one or more of the above noted method actions. This is thus related art that some aspects of the invention can utilize.

Figure 19:
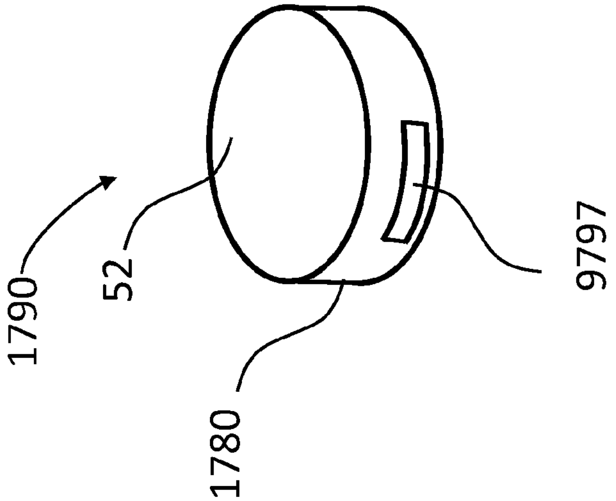
Figure 18:
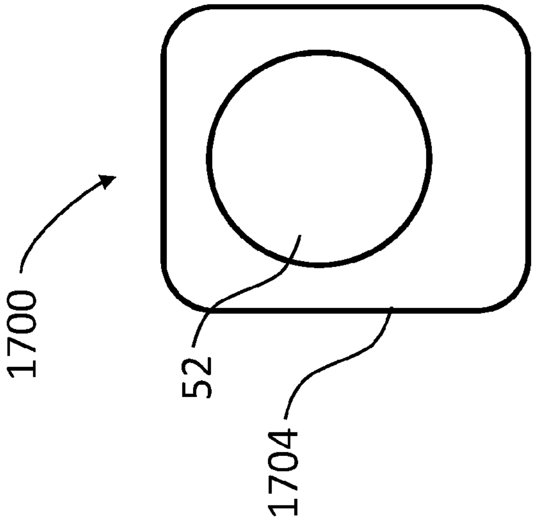

FIG. 17 presents an exemplary implantable microphone unit 1700 that is configured to be removably attached to another unit implanted in a recipient, such as the unit that includes a signal processor, via electrical lead 1407. This microphone unit can correspond to microphone 12 above in general terms. In this embodiment, Housing 1704 establishes the interior of the microphone 1700, as is the case with housing 1404 above. In this exemplary embodiment, the housing 1704 indirectly supports the diaphragm 52. More specifically, in this exemplary embodiment, the diaphragm 52 is part of a modular assembly 1790 is shown in FIG. 19 that is insertable into the housing 1704 as a module. In this regard, the module 1790 can include a manifold 1780 that supports the diaphragm 52. The manifold 1780 can also support the microphone transducer 97. Briefly, the body of the manifold can be inserted into an opening in the top or the bottom of the housing and then welded to the body of the housing to establish a hermetic barrier between the inside of the housing 1406 and the outside environment. FIG. 18 presents a top the of the microphone 1700 with the module 1790 attached to the housing. As can be seen, when module 1790 is attached to housing 1704, the diaphragm 52 is exposed to the ambient environment thus enabling the diaphragm to move or otherwise be sensitive to energy that travels through the overlying tissue that originates from ambient sound of the recipient of the implanted microphone.

Support brackets 1717 are located within housing 1704 that receive the manifold 1780 otherwise hold the manifold 1780 in position within the housing 1704 and otherwise support the housing. In an alternative embodiment, walls of the housing can be utilized to support or otherwise hold the manifold 1780 within the housing. In the embodiment depicted in FIG. 17, the manifold has been inserted in the housing through the top opening of the housing and then the outer periphery of the manifold has been laser welded to the walls of the housing.

In an exemplary embodiment, the manifold is a titanium body out of which is machined the space for chamber 30.

The manifold can establish the structure that bounds a portion of the front volume of the microphone system (and, in combination with the diaphragm 52, all of the front volume). The manifold can establish the bounds of a portion of the chamber 30, such as the first portion 32 and the second portion 34, which second portion can lead to the transducer 97.

In an exemplary embodiment, the manifold has an opening 9797 (which can also be machined into the titanium body noted above) to receive transducer 97 (transducer assembly). In an exemplary embodiment, the transducer 97 is adhesively connected to the structure of the manifold. Here, the diaphragm 54 faces the passageway 34 to the first portion 32, thus placing the diaphragm 54 into fluid communication with the chamber 30. Attachment arrangement 1332 can be an adhesive attachment that encircles the opening for the diaphragm 54 and encircles the passageway of the second portion 34 that faces the diaphragm. In an exemplary embodiment, the attachment arrangement 1332 can be achieved by placing a bead of adhesive around the diaphragm 54 on the face of the transducer that faces in the direction of the second portion 34, and then inserting the transducer 97 into the manifold until the face of the transducer supporting the bead of adhesive contacts the manifold. Upon curing, in an exemplary embodiment, a hermetic seal and/or an airtight seal is established between the front volume and the remainder of the housing.

In this exemplary embodiment, the front volume/chamber 30 is completely fluidically isolated from the interior of the housing 1406. In this regard, the glue 1332 establishes a gas tight barrier between the chamber 30 and the remainder of the housing. The walls of the transducer 97 are also gas tight. In some embodiments, gas may be transferred between the front volume and the back volume, the back volume being established by the interior of the transducer 97 behind the diaphragm 54. Because the housing of the transducer 97/walls of the transducer 97 are gas tight, even if there is gas transfer between the front volume and the back volume, there is no gas transfer between the front volume and the remainder of the housing.

It is briefly noted that in at least some implementations, there can be tolerance leakage or otherwise some gas transfer of a de minimus amount. In this regard, almost all systems are subject to some form of gas transfer. By gas tight, it does not mean that the walls or the adhesive are absolutely gas impermeable. There may be some amount of gas transfer between the various volumes. By rough analogy, a bottle of a carbonated soft drink will eventually lose its carbonation even if the bottle is never opened. This does not mean that the bottle is not gas tight.

With the embodiment of FIG. 17, the front volume/volume established by chamber 32 is known, and is fixed and otherwise remains constant (save for movement of the diaphragm 52). This is utilized to determine how the transfer function of the microphone has changed owing to changes in pressure in the front volume due to a change in pressure of the ambient environment, and then the change in the transfer function is taken into account electronically by the implantable microphone and the output of the microphone is adjusted to take in account the transfer function.

Figure 20:
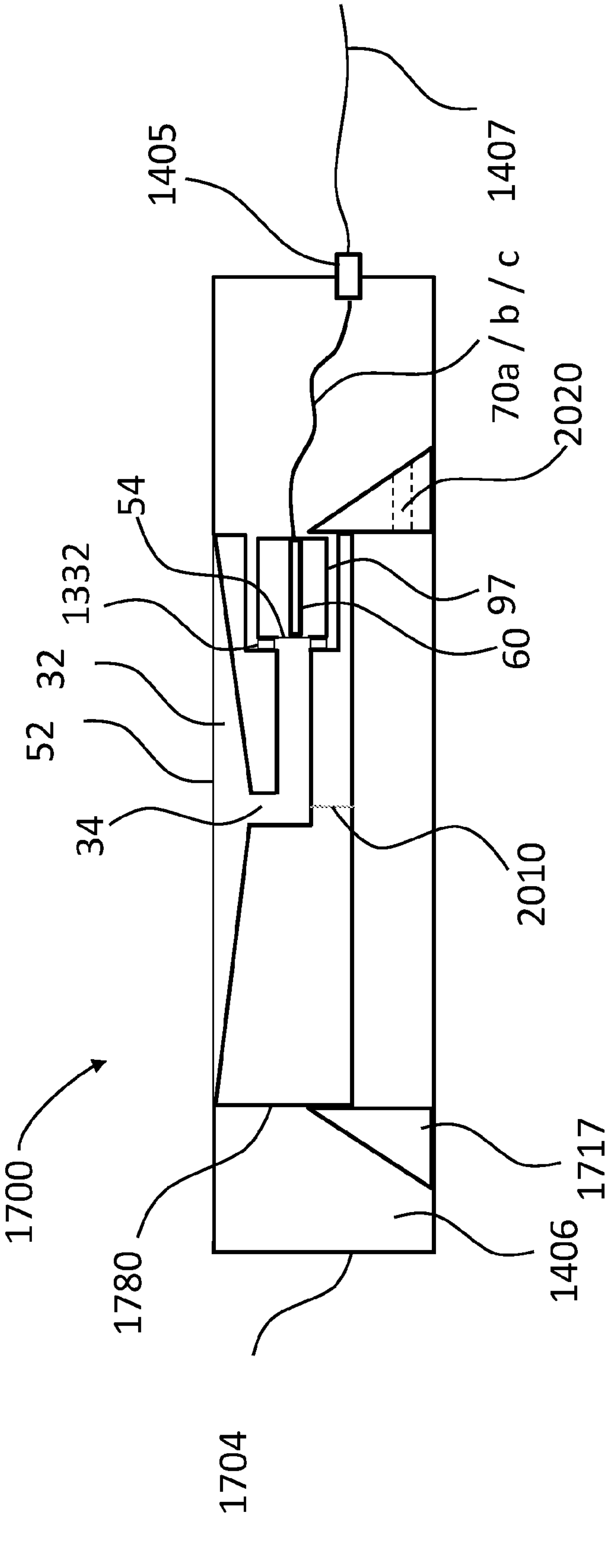
Figure 21:
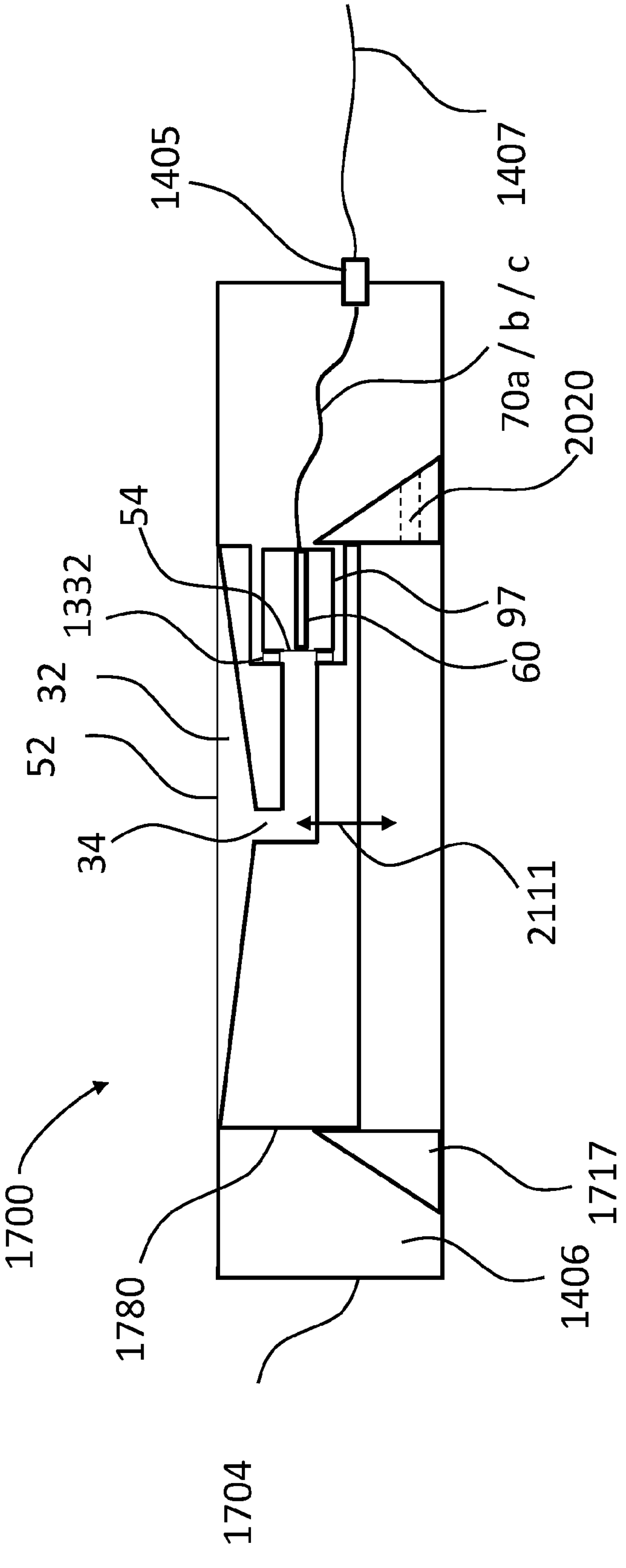

In contrast to the embodiment of FIG. 17, the embodiment of FIG. 20 enables gas transfer between the chamber 30 and the interior of the housing 1406. Here, a passageway 2010 is drilled through the second portion 34 through the body of the manifold 1780 so that an opening in the manifold is present facing the housing at the bottom of the manifold. Gas can be transferred from the interior 1406 of the housing 1704 into the front volume and/or vice versa upon pressure changes in the front volume. In this exemplary embodiment, passageway 2020 extends through bracket 1717 in embodiments where the bracket completely surrounds the bottom of the manifold 1780 so as to enable gas transfer from beneath the manifold to the remainder of the housing outside the bracket. In other embodiments, the brackets are bifurcated and otherwise spaced apart, thus enabling gas transfer. This is schematically depicted by the double arrow 2111 in FIG. 21. In an exemplary embodiment, depending on the size, passageway 2010 can expand the front volume to include the housing volume.

It is briefly noted that as we use the phrase "expanded volume," we are referring to an acoustic volume. The front volumes and the back volumes are volumes that impact acoustic sensitivity. By controlling the front volumes and the back volumes, sound energy does not escape from these volumes (at least the front volume), or at least only limited amounts of sound energy escape from these volumes, which limited amount is sufficient to maintain an efficacy of the sensitivity of the microphone system.

Figure 22:
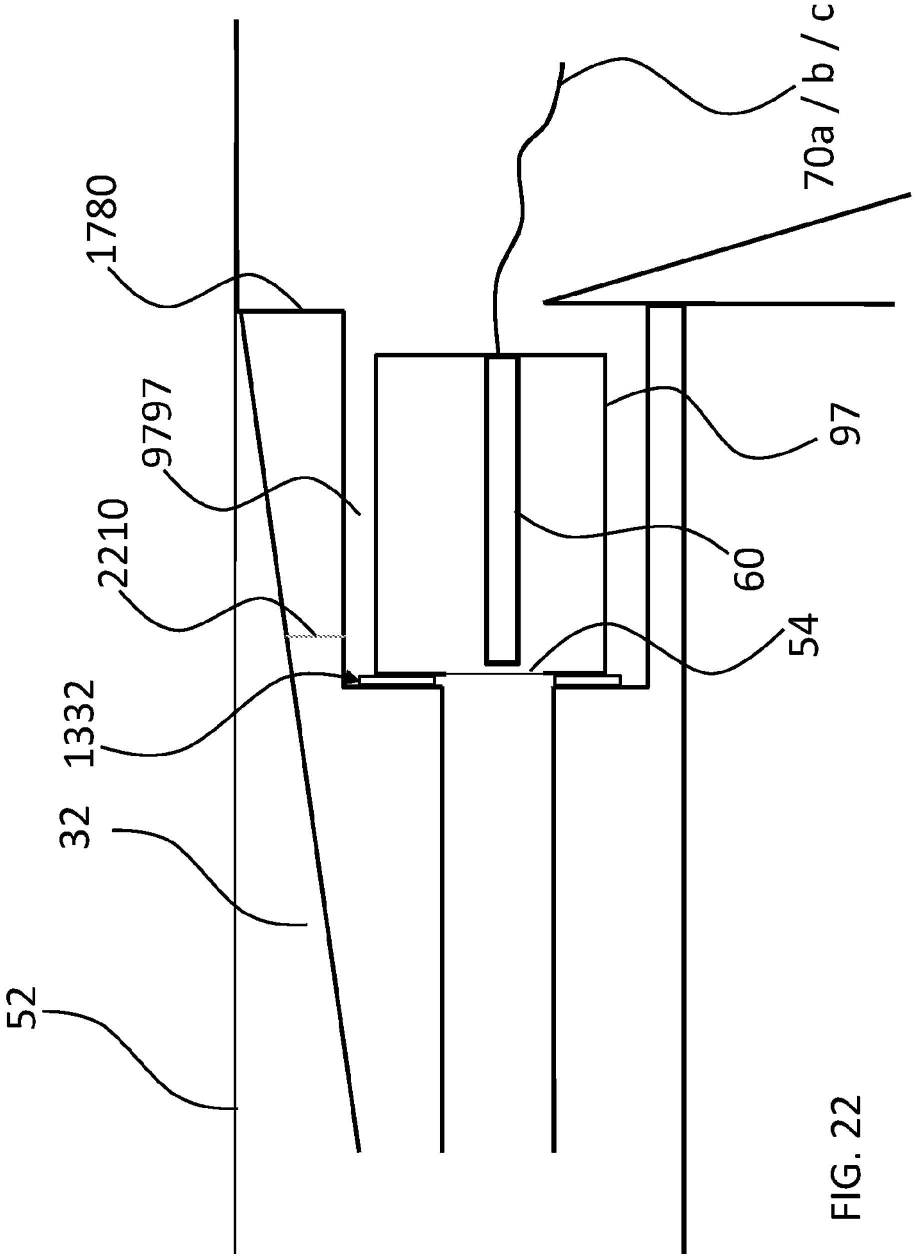

FIG. 22 presents another exemplary embodiment that enables fluid transfer from the front volume to the volume established by the remainder of the housing. Here, there is a passageway 2210 that has been drilled through the body of the manifold from the first portion 32 to the cavity 9797 in the manifold that is provided for the transducer 97. Because of the space between the transducer 97 and the cavity 9797, gas can be transferred between the interior of the housing and the portion 32 of the cavity 30, and thus between the interior of the housing and the front volume. As can be seen, this completely bypasses the interior of the transducer as is the case with the embodiment of FIG. 20. The embodiment of FIG. 22 thus places the front volume into fluid communication with the volume of the housing.

Figure 23:
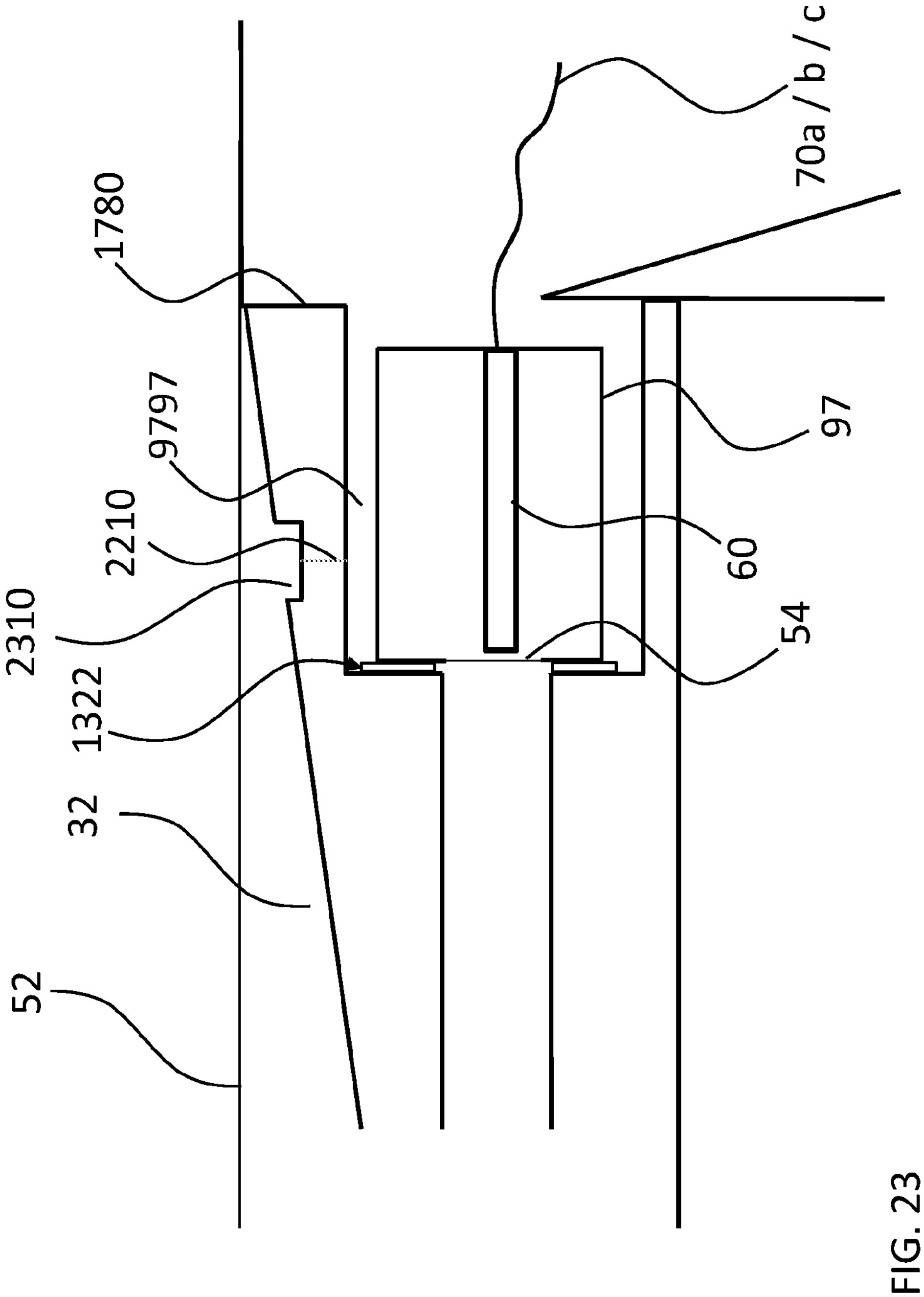

FIG. 23 presents an exemplary embodiment the parallels FIG. 22, except that wide bore 2310 has been machined into the body of the manifold 1780 extending completely below the grade of the surface of the manifold that faces the diaphragm 52. This can have utilitarian value with respect to establishing a generally flat bottom surface of the bore 2310. This can provide easier drilling of passageway 2210 in at least some exemplary embodiments because, for example, the drill bit utilized to drill the passageway 2210 interfaces with a flat surface, more accurately, interfaces with the surface that is normal to the longitudinal axis of the drill bit, thus reducing the likelihood that the drill bit will "walk" when first contacting the titanium of the manifold 1780.

Figure 24:
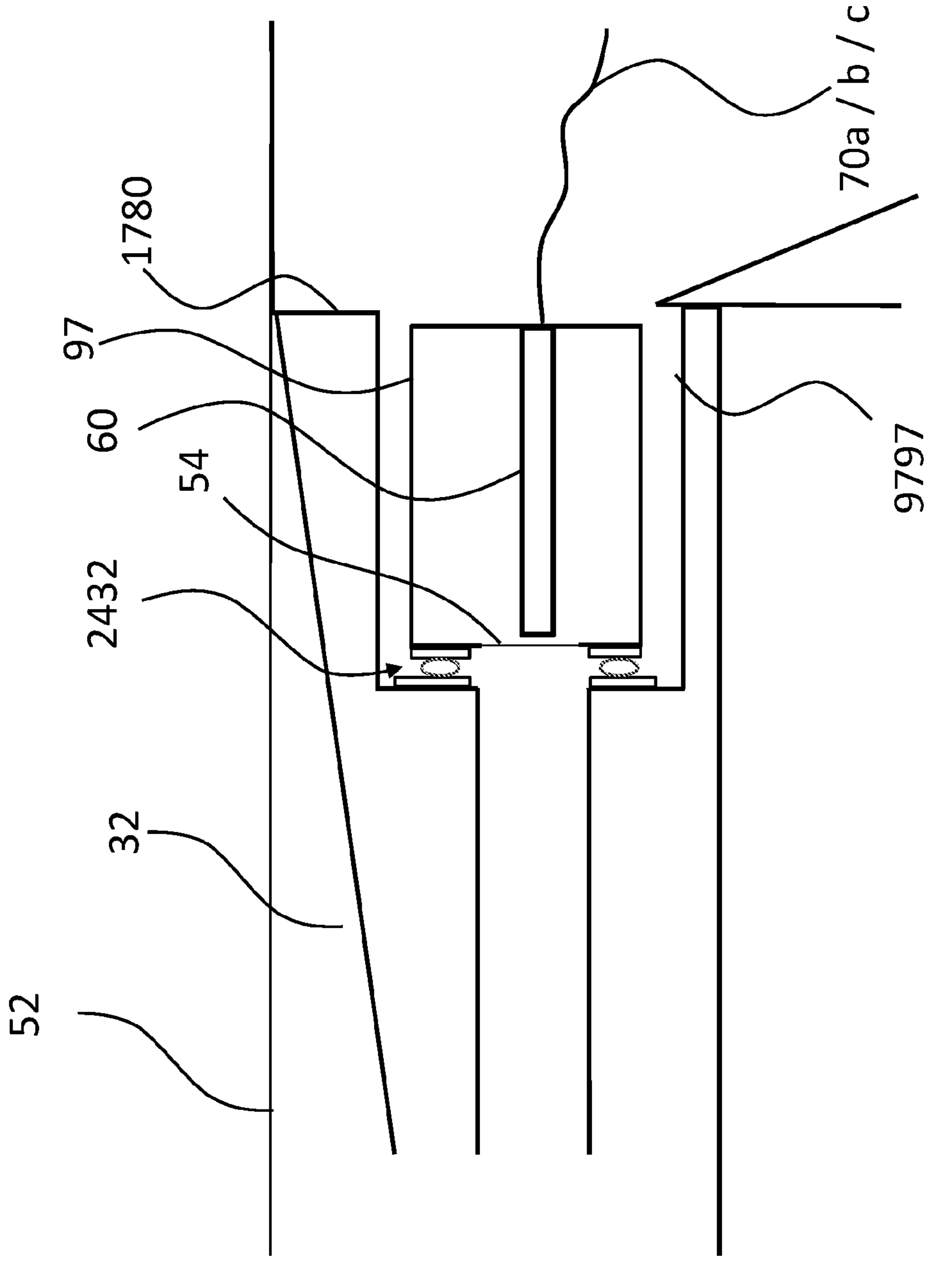
Figure 25:
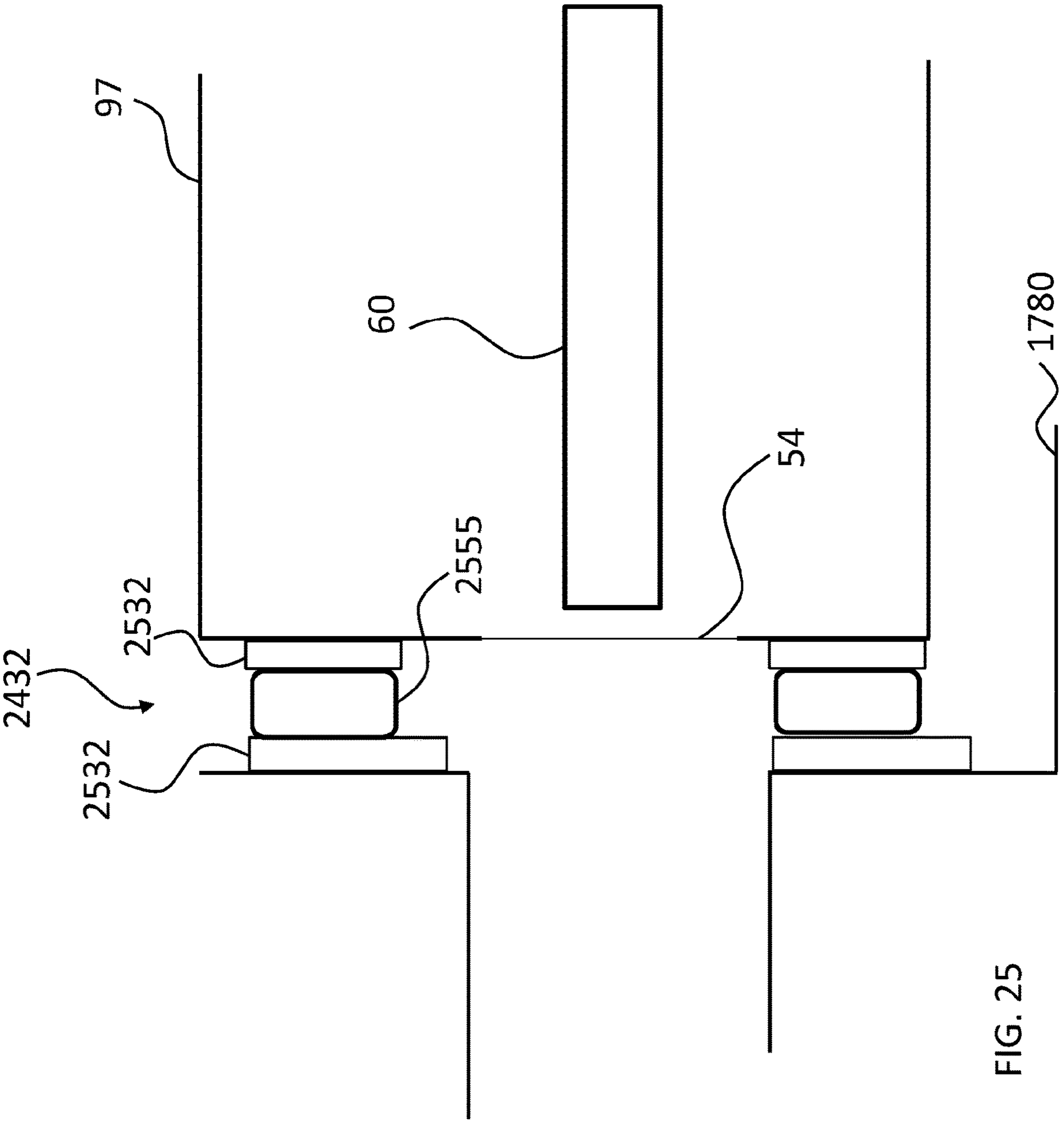

FIGS. 24 and 25 present an alternate embodiment where there is no discrete machined passage in the manifold 2780 that enables gas transfer between the chamber 30 into the housing beyond the cavity 9797 for the transducer 97. Here, the securement apparatus that secures the transducer 97 to the manifold 1780 is securement apparatus 2432 (this is a cross-section of a circular gasket—the backlines between the top portion and the bottom portion are removed for clarity). Securement apparatus 2432 includes adhesive layers 2532, a first of which is adhesively bonded to the wall of the manifold 1780, and a second of which is adhesively bonded to the wall of the transducer 97 as shown. Both of these adhesive layers 2532 are also bonded to a gasket 2555.

In an exemplary embodiment, the gasket in combination with the adhesive layers establishes an airtight seal between the manifold and the transducer 97, thus establishing an airtight seal with respect to the front volume and the remainder of the housing. In this regard, FIG. 24 can correspond to the embodiment of FIG. 17 presented above. That is, the embodiment of 24 establishes a fixed front volume that is known, and thus changes in the pressure in the front volume can be utilized to determine how to adjust the signal output of the microphone to take into account the change in the transfer function as a result of the increase and/or decrease of the pressure in the front volume.

Figure 26:
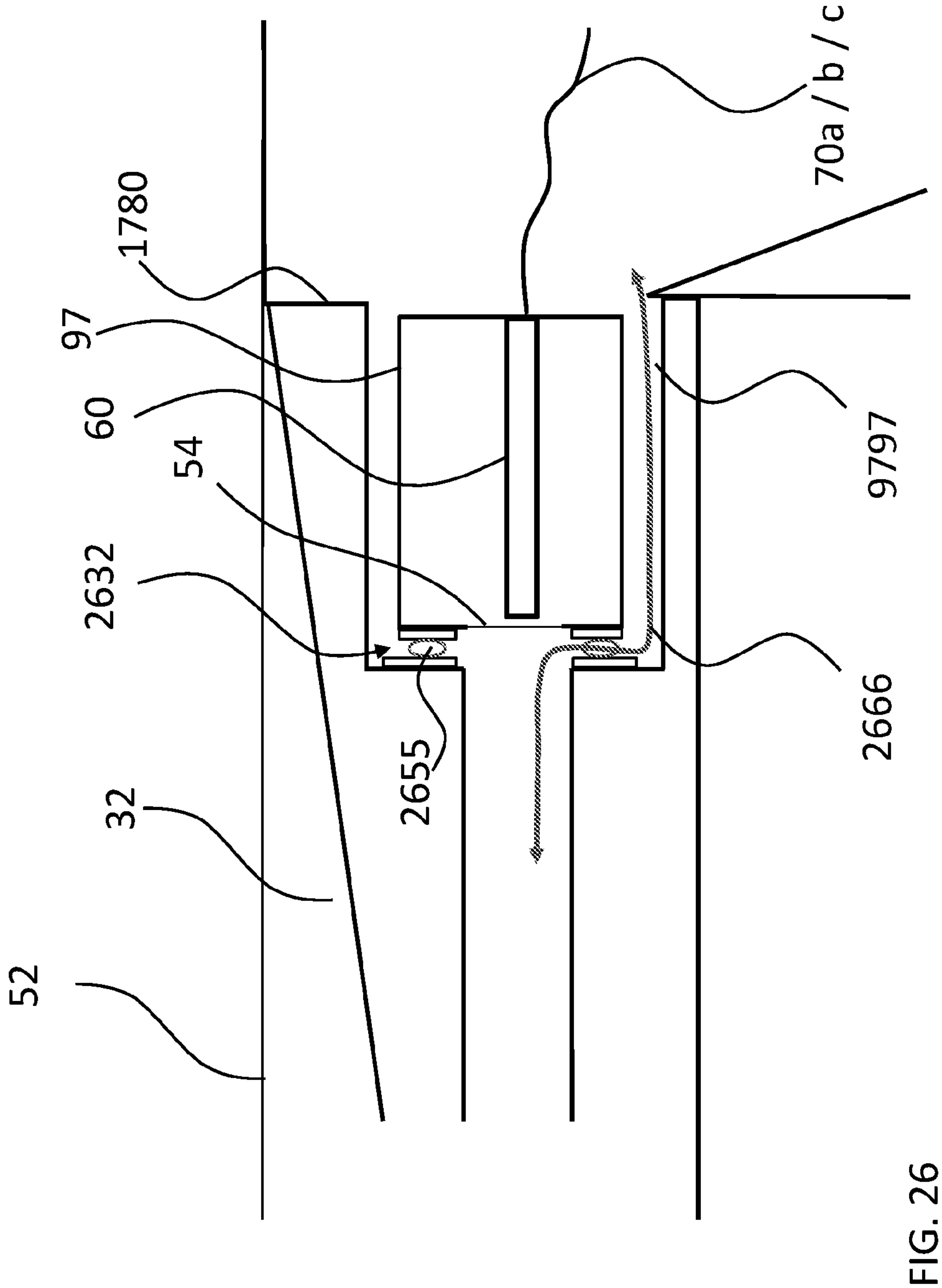

Conversely, in an exemplary embodiment, the gasket 2655 used in the securement apparatus 2632 of FIG. 26 is porous and thus enables gas transfer from the front volume to the remainder of the housing as shown in FIG. 26 as is exemplary represented by the double arrow 2666. The same adhesive layers can be used as in the embodiments above.

In an exemplary embodiment, there is no active electronic adjustment of a transfer function of the microphone system.

By rough analogy, the passageways/gaskets, etc., can be considered to a harbor port with a break wave barrier, such as a narrow inlet/outlet. The narrow inlet/outlet can stop or the large waves (high magnitude waves) of the ocean from imparting energy into the volume of the port, or otherwise reduce the amount of energy that is imparted into the port by the waves. Yet the narrow inlet/outlet can also permit the tide to rise and fall within the port in effectively the same manner as that which occurs outside the port. In a similar vein, by utilizing a limited area opening, the pressure waves from the sound are contained in the front volume, and thus the energy is not dissipated into the other volume (housing volume). This thus maintains the sensitivity of the microphone system, whereas if the energy was dissipated in substantial amounts into the other volume, the amount of energy impinging upon the microphone transducer would be less, and in some embodiments, significantly less such that the sensitivity of the microphone system would be reduced.

Referenced above was the concept of the tolerance leaking in the comparison to a soft drink. There can be considered one end of the spectrum with respect to the concept of fluid transfer between the volumes. On the other end of the spectrum is an opening wide enough that the another volume effectively becomes part of the front volume. The teachings detailed herein can strive towards reaching the in between area. The ability to transfer fluid between the volumes at speeds that are fast enough to provide for pressure equalization or compensation or otherwise to address the transfer function changes, while still maintaining an efficacious sensitivity of the microphone system. In an exemplary embodiment, the idea is to correlate the fluid transfer rates to the lower frequencies of the pressure waves that are created as a result of the ambient sounds, where the correlation is such that the fluid transfer rates are slower than those lowest frequencies in a significant or otherwise efficacious manner.

In an exemplary embodiment, the adhesive layers and the gaskets are circular and can be concentric with each other, and also can be concentric with the passageway of the front volume to the transducer and/or can be concentric with the opening in the housing of the transducer 97/concentric with the diaphragm 54.

In view of the above, it can be seen that there are embodiments where there is a subcutaneous microphone where the teachings herein can maintain or otherwise limit a variation of a performance can would otherwise vary over time, such as when the microphone is exposed to an ambient pressure that is different than the internal pressure (at least that of the front volume). This performance change can be due to the fact that the microphone is placed between the acoustic cavity and the rest of the hermetic housing and acts as a seal between the two. Without the teachings herein, in an exemplary control embodiment, a baseline device can be exposed to vacuum (such as that which is done to test for leakage out of the housing), where it can take days or weeks or months for the pressure to equalize between the acoustic cavity (front volume) and the hermetic assembly. In an exemplary embodiment, without the gas transfer teachings herein (e.g., the transducer is adhesively attached to the manifold to create a gas tight seal without a gasket), it can take at least and/or equal to 2, 3, 4, 5, 6, 7, 8, 9, 10, 11, 12, 13, 14, 15, 16, 17, 18, 19, 20, 25, 30, 35, 40, 45, 50, 55, or 60 days to achieve a pressure equalization and/or to achieve some of the percentage equalizations detailed herein. The teachings detailed herein can reduce these timeframes. Indeed, in an embodiment, the results of a hermeticity test using a vacuum might still be present when the implantable microphone is implanted in a human, without the teachings detailed herein. In any event, if a recipient takes a plane or goes to higher altitudes, the ambient pressure would be different and it will take a longer time for the pressure to equalize, causing the microphone to have varying performance over time. The teachings herein can avoid this or otherwise return the performance closer to that which should be the case.

And note that in an embodiment, the front volume is devoid of liquid. Gas is the only fluid in the front volume.

Embodiments thus establish that the front volume is in fluid communication with a bigger volume, such as the bigger volume of the housing volume. Embodiments also limit/prevent adverse effects on the acoustic sensitivity of doing so. Using a properly selected porous element, such can achieve pressure equalization that is quick enough to be utilitarian without having any negative or otherwise tolerable negative impacts impact on the acoustic sensitivity.

Embodiments thus quicken an equalization between the acoustic cavity and the hermetic housing so that a steady-state is reached much faster than that which would otherwise be the case (minutes to fractions of an hour vs. days or weeks or longer). Also, the pressure within the acoustic cavity can stay more or less constant even when the ambient pressure varies.

In an exemplary embodiment, a pressure decrease of 27% (about what happens in an airplane pressurized to pressure at 8000 feet taking off from sea level) within 7, 6, 5, 4, 3, 2, or 1 minutes (which can occur in a linear manner over those times) in ambient atmosphere will result in less than and/or equal to a 15, 14, 13, 12, 11, 10, 9, 8, 7, 6, 5, 4.5, 4, 3.5, 3, 2.5, 2.4, 2.3, 2.2, 2.1, 2.0, 1.9, 1.8, 1.7, 1.6. 1.5, 1.4, 1.3, 1.2, 1.1, 1.0, 0.9, 0.8, 0.7, 0.6, 0.5, 0.4, 0.3, 0.2, or 0.1 or zero percent decrease, or any value or range of values therebetween in 0.01 percent increments, at least in less than or equal to 30, 25, 20, 15, 14, 13, 12, 11, 10, 9, 8, 7, 6, 5, 4.5, 4, 3.5, 3, 2.5, 2.4, 2.3, 2.2, 2.1, 2.0, 1.9, 1.8, 1.7, 1.6. 1.5, 1.4, 1.3, 1.2, 1.1, 1.0, 0.9, 0.8, 0.7, 0.6, 0.5, 0.4, 0.3, 0.2, or 0.1 or zero minutes, or any value or range of values therebetween in 0.01 minute increments.

In addition to the gaskets above, other implementations can entail having a small hole drilled to connect the acoustic cavity to the housing volume. The size is small enough to avoid effective deleterious effects on the acoustic sensitivity. Corollary to this is to drill a hole in the MEMS casing to connect its back volume to the housing volume, again with a small diameter.

Figure 27:
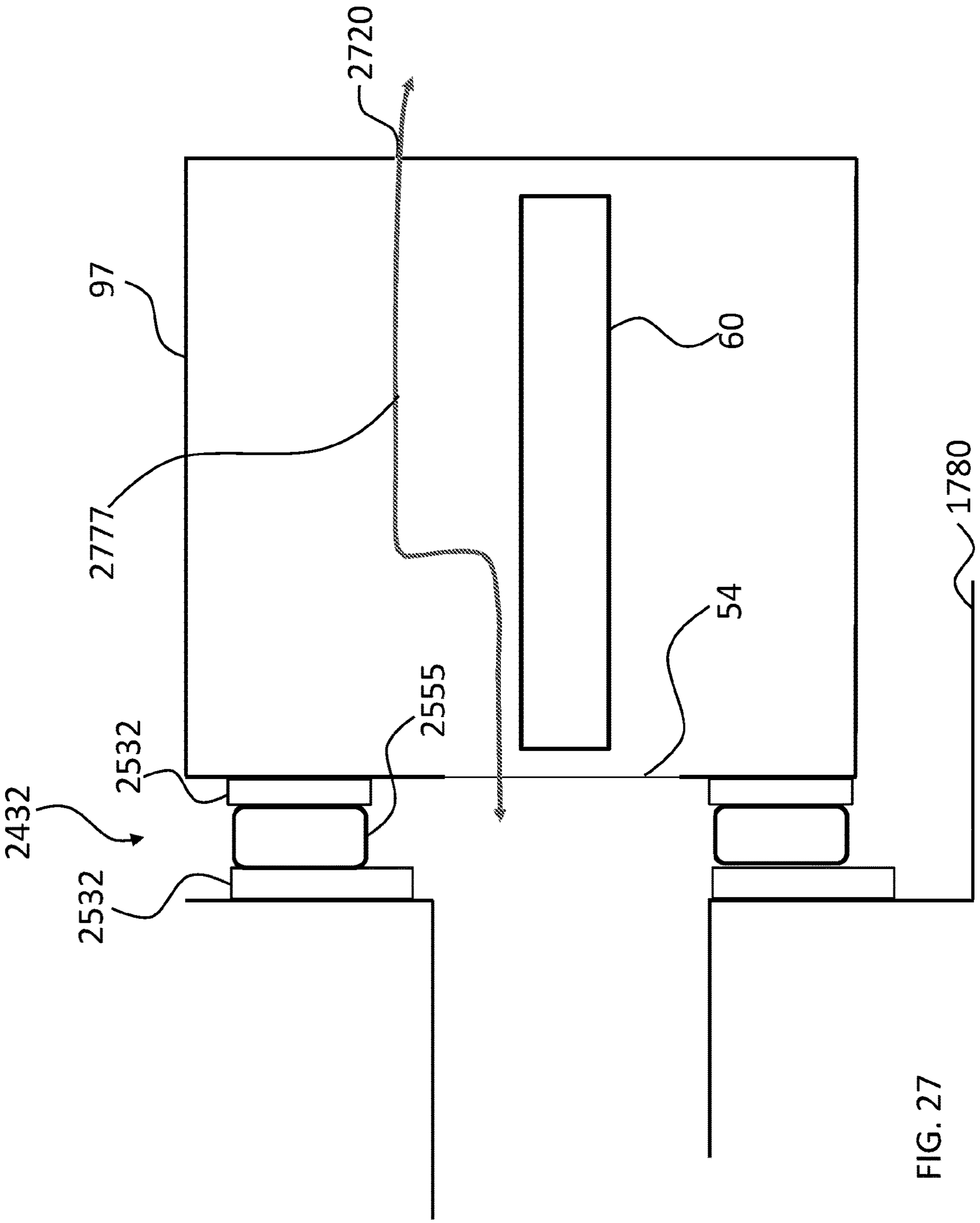

FIG. 27 presents an exemplary embodiment where a hole 2720 is located in the housing/casing of the transducer 97. In this exemplary embodiment, the diaphragm 54 is porous or otherwise has one or more holes therein that enable gas transfer between the cavity 30/front volume and the housing/casing of the transducer 97, and thus into the back volume. Further, the hole 2777 enables gas transfer between the interior of the housing/casing of the transducer 97 and the interior of the housing of the implantable microphone. All of this is represented by the double arrow 2777.

Thus, it can be seen that embodiments manage pressure change in acoustic cavity (front volume). Some embodiments achieve this by permitting gas transfer between the acoustic cavity and the volume established by the hermetic assembly (interior of the housing, volume in the housing outside the manifold). This can be implemented by connecting both cavities to enable gas transfer between both cavities. In some embodiments, there is utilitarian value in harnessing the availability of the larger volume of the housing volume relative to the acoustic cavity. Above, in some embodiments as seen, a porous layer is introduced between the microphone and the acoustic cavity, or more accurately, the structure establishing the acoustic cavity, which porous layer is in fluid communication with the cavity of the implant housing. Alternatively, or in addition to this, it is seen that there can be a small hole drilled to connect the acoustic cavity to the housing volume. In the embodiments above, a diameter of the hole is less than 4 or 3 or 2 or 1 micrometers. In some embodiments, there is a hole that has been drilled into the MEMS casing of the transducer 97 to connect its back volume to the housing volume. The hole has a small diameter, such as those just recited.

In view of the above, it can be seen that in an exemplary embodiment, there is a device that is an implantable microphone (such as a subcutaneous microphone) that includes a transducer assembly, such as transducer 97 above, and a chamber in which a gas is located such that vibrations originating external to the device based on sound are effectively transmitted therethrough. This can correspond to chamber 30 above. This exemplary embodiment, the transducer assembly is in effective vibration communication with the gas, wherein the transducer assembly is configured to convert the vibrations traveling via the gas to an electrical signal. Further, the chamber and the transducer assembly are part of a microphone system of the implantable microphone, wherein the chamber corresponds to a front volume of the microphone system, and the transducer assembly includes a back volume corresponding to at least part of a back volume of the microphone system (in some embodiments, it is the entire back volume—that is, the volume inside the casing bounded by the casing and the diaphragm 54 establish the entire back volume of the microphone system). In this exemplary embodiment, the implantable microphone is configured to purposely enable pressure equalization of the front volume with another volume (such as the volume of the housing of the implantable microphone) within the implantable microphone in real time and/or within a time period substantially faster than tolerance leakage between the front volume and the another volume via a route that bypasses a back volume of the microphone system. This can correspond to the embodiments of FIGS. 20 to 23 and 27 and 27 by way of example only. Referring by way of example of FIG. 26, the double arrows 2666 represent a route that bypasses the interior of the transducer 97, and thus bypasses the back volume of the microphone system.

By "real time," it is meant a temporal period that is shorter than that which results from natural leakage between the front volume and the another volume in the absence of the purposeful passageways detailed herein (including the porous gasket). A control could be the embodiment of FIG. 25, where the gasket 2555 is solid/not designed to enable gas transfer. In an exemplary embodiment, the pressure adjustment of the front volume occurs within a time period that is less than 25, 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, 0.3, 0.2, or 0.1 percent, or any value or range of values therebetween in 0.01% increments of that which would occur due to normal leaking, if such is present. (It is noted that not all of these values are "real time" values.) In this regard, it can be seen that in an exemplary embodiment, the implantable microphone is configured to adjust a pressure of the front volume beyond that which results from tolerance leakage therebetween (tolerance leakage being the leakage that results from the fact that the components all have manufacturing tolerances associated therewith and any assembly of components will never be perfect).

In an exemplary embodiment, the pressure adjustment is a pressure adjustment (pressure equalization) that is achieved based primarily on factors associated with transfer of gas from the front volume to the another volume (volume of the housing). In an exemplary embodiment, the pressure adjustment is a pressure adjustment that is achieved based primarily on factors not associated with transfer of gas to or from the back volume. In an exemplary embodiment, more than 99, 98, 97, 96, 95, 90, 85, 80, 75, 70, 65, 60, 55, 50, 45, 40, 35, or 30% or any value or range values therebetween in 1% increments of the resulting pressure adjustment is achieved due to the phenomenon of the gas transfer from the front volume to the another volume and/or vice versa. In an exemplary embodiment, less than 10, 9, 8, 7, 6, 5, 4, 3, 2, or 1% of the resulting pressure adjustment is achieved due to phenomenon of the gas transfer from the front volume to the back volume or vice versa. In an exemplary embodiment, aside from movement of the diaphragm 54, the back volume size remains constant. Still further, in at least some exemplary embodiments, the implantable microphone is configured to adjust a pressure of the front volume beyond that which results from leakage through a dedicated diaphragm of the transducer and movement of the dedicated diaphragm of the transducer, where "dedicated diaphragm" is the diaphragm 54, as opposed to the diaphragm 52, which is not dedicated to the transducer but instead dedicated to the overall implantable microphone. Again, it is noted that diaphragm 52 is a diaphragm that establishes a hermetic barrier between the interior of the implantable microphone and an exterior thereof, as opposed to diaphragm 54, which is completely entirely inside the implantable microphone and not exposed to the ambient environment thereof.

In view of the above, it can be seen that the implantable microphone is configured to obtain the aforementioned partial equalization/pressure adjustment with a fixed/non adjusted volumetric size of the front volume and/or the back volume and/or the another volume. In an exemplary embodiment, other than movements of the diaphragm 52 and the diaphragm 54, the volumes implicated by the microphone system are fixed. That is, the back volume is established by the volumes of the transducer microphone element assembly 97, and the volume of the back volume is not changed inside or outside the transducer microphone element assembly 97. That is, in some embodiments, the transducer assembly includes a diaphragm (diaphragm 54) that receives vibrations traveling via gas of the front volume, the transducer assembly configured to convert movement of the diaphragm of the transducer to an output signal, and other than a change due to movement of the diaphragm of the transducer, the volumetric size of the back volume is fixed.

In an exemplary embodiment, none of the aforementioned volumes change more than 10, 9, 8, 7, 6, 5, 4, 3, 2, or 1% during pressure equalization and/or pressure adjustment relative to the volumes at the beginning of any pressure equalization and/or pressure adjustment.

In an exemplary embodiment, the pressure equalization and/or pressure adjustment is achieved completely passively. There is no control unit, such as a microprocessor or dedicated computer chip or the like that is part of the implantable microphone or part of the implantable component of the prosthesis that controls the pressure adjustment/equalization.

In view of the above, it can be seen that in an exemplary embodiment, there is an implantable microphone that includes a transducer and a chamber in which a gas is located such that vibrations originating external to the microphone based on sound are effectively transmitted therethrough. In this embodiment, the transducer is in effective vibration communication with the gas, and the transducer is configured to convert the vibrations traveling via the gas to an electrical signal, all consistent with the above embodiments. Still further, the chamber and the transducer correspond to a microphone system, wherein the chamber corresponds to a front volume of the microphone system, and the transducer includes a back volume corresponding to the back volume of the microphone system, and the implantable microphone is configured to obtain pressure equalization/adjustment of the front volume without a volumetric size change of the various volumes described above and/or less than the aforementioned changes.

With reference to the embodiment of FIG. 26 for example as noted above, the route that bypasses the back volume of the microphone system extends through a porous structure that significantly slows gas transfer between the front volume and the another volume. In an exemplary embodiment, the porous structure results in a lengthening of the time period of pressure equalization from the time of maximum pressure change within the front volume to the time when the pressure is changed within the front volume to a value that is within 5, 4, 3, 2, 1, 0.5, or 0.1% or any value or range of values therebetween in 0.1 increments of the pressure prior to the change by more than or equal to 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 75, 100, 125, 150, 175, 200, 225, 250, 275, 300, 350, 400, 450, 500, 550, 600, 650, 700, 800, 900, or 1000 times or any value or range of value in 1 increment relative to that which would be the case if the porous element was not present, all else being equal (i.e., remove the porous gasket 2655, but the adhesive layer is present). Thus the device is configured to transfer gas between the chamber and the volume outside the transducer assembly through a path with a porous component that slows the transfer by at least any of the above times relative to that which would be the case in the absence of the porous component, all else equal.

Also, again with reference to FIG. 26, in an exemplary embodiment, the device includes a manifold that supports and/or establishes at least part of the front volume, and also includes a porous gasket that is located between the transducer assembly and the manifold, the route extending through the porous gasket. In an exemplary embodiment, the another volume is completely separate from the transducer assembly. In an exemplary embodiment, the another volume is a volume that does not include the volume inside the transducer assembly (even if the transducer assembly is located in the housing).

Consistent with the embodiments described above, the another volume is a general unused volume of a main housing of the implantable microphone, the main housing being exposed to body fluids when the implantable microphone is implanted in a human and establishing part of a hermetic barrier of the implantable microphone. It is noted that in some embodiments, the main housing can include electronic components such as an amplifier and/or a microprocessor and/or a battery or otherwise a power storage device and/or an ASIC and/or a PCB. Indeed, in an exemplary embodiment, the housing is part of an integrated housing of a totally implantable hearing prostheses, such as a totally implantable cochlear implant. In this regard, the housing can include a stimulator of the cochlear implant. The other volume would be the volume around one or more or all of these components. The another volume would be the volume that could be filled with a fluid and/or the another volume is the volume that is exposed to the argon gas and/or whatever inert gas is utilized to pressurize or otherwise displace air from inside the housing during the manufacturing process thereof.

It is briefly noted that the designation of the devices being an implantable microphone is not mutually exclusive with a device that has other functionalities, such as the functionality of a stimulator of a cochlear implant. That said, in some embodiments, the devices solely an implantable microphone, wherein the device is configured to be placed into electrical communication with a separate housing that contains the housing of a stimulator by way of example.

Also, in at least some exemplary embodiments, the microphone device is configured (e.g., the front volume, the another volume and the route are sized and dimensioned and configured) to equalize a pressure imbalance of the front volume with the another volume of Z percent relative to the another volume to less than 20, 19, 18, 17, 16, 15, 14, 13, 12, 11, 10, 9, 8, 7, 6, 5, 4, 3, 2, or 1% of the maximum pressure imbalance within and/or no more than H seconds from the maximum pressure imbalance. In an exemplary embodiment, Z is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 120, 130, 140, 150, 160, 170, 180, 190, or 200 or more, and H is 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, 50, 60, 70, 80, 90, 100, 125, 150, 175, 200, 225, 250, 275, 300, 350, 400, 450, 500, 550, 600, 650, 700, 750, 800, 850, 900, 950, 1000, 1250, 1500, 1750, 2000, 2500, or 3000, or any value or range of values in 1 increment (e.g., 300, 400, 100 to 400, etc.). By relative to the another volume, it is meant that the another volume is the denominator. Thus, a pressure of 2.2 units in the front volume and a pressure of 2.0 units in the another volume would be a 10% pressure difference relative to the another volume. The 2.2 units, if the maximum pressure imbalance, is the time from which H starts (i.e., as opposed to 2.15 units). In this regard, the above features are linked to a percentage of the largest pressure imbalance, as opposed to the elimination completely of the pressure imbalance.

Also, in an exemplary embodiment, the device is configured (e.g., the front volume, the another volume and the route are sized and dimensioned and configured—this includes the placement of the porous element between the transducer and the membrane) to prevent the pressure imbalance of Z percent to be equalized faster than I seconds where, in an exemplary embodiment, I is 0.001, 0.002, 0.003, 0.004, 0.005, 0.006, 0.007, 0.008, 0.009. 0.10, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.40, 0.45, 0.5, 0.55, 0.6, 0.65, 0.7, 0.75, 0.8, 0.85, 0.9, 1, 1.25, 1.5, 1.75 or 2, 2.5, 3, 3.5, 4, 4.5, 5, 5.5, 6, 7, 8, 9, 10, 11, 12, 13, 14, 15, 16, 17, 18, 19, 20, 25, 30, 35, 40, 45, 50, 55, 60, 70, 80, 90, 100, 125, 150, 175, or 200 or any value or range of values therebetween in 0.001 increments.

It is noted that the above pressure equalizations are achieved in time periods that are greater than or equal to 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 75, 100, 125, 150, 175, 200, 225, 250, 275, 300, 350, 400, 450, 500, 550, 600, 650, 700, 800, 900, or 1000 times, or any value or range of value in 1 increment relative to that which would be the case if the porous element was not present, all else being equal.

In an exemplary embodiment, there is a device, which can be an implantable microphone, including a subcutaneous microphone, comprising a transducer assembly, and a chamber in which a gas is located such that vibrations originating external to the device based on sound are effectively transmitted therethrough. The transducer assembly is in effective vibration communication with the gas, wherein the transducer is configured to convert the vibrations traveling via the gas to an electrical signal, the chamber and the transducer assembly are part of a microphone system of the implantable microphone, wherein the chamber corresponds to a front volume of the microphone system, and the transducer assembly includes a back volume corresponding to at least part of a back volume of the microphone system (the hole 2720 can, in at least some embodiments, effectively expand the back volume, depending on the size of the hole—more on this below), and the device is configured to transfer gas between the chamber and a volume outside the transducer assembly, the volume outside the transducer assembly being a fixed volume.

In some embodiments, the back volume is completely fluidically isolated from volume outside the transducer assembly beyond a fluid transfer route extending directly between the back volume and the front volume, if present (e.g., in the case of a pinhole in the diaphragm 54). Conversely, as seen above, the back volume can be in fluid communication with a volume outside the transducer assembly beyond the fluid transfer route extending directly between the back volume and the front volume, such as via the hole in the back of the transducer of FIG. 27 and in some embodiments, it is noted that hole can be located elsewhere, such as on the side, providing that the hole can be in fluid communication with the another volume.

Figure 28:
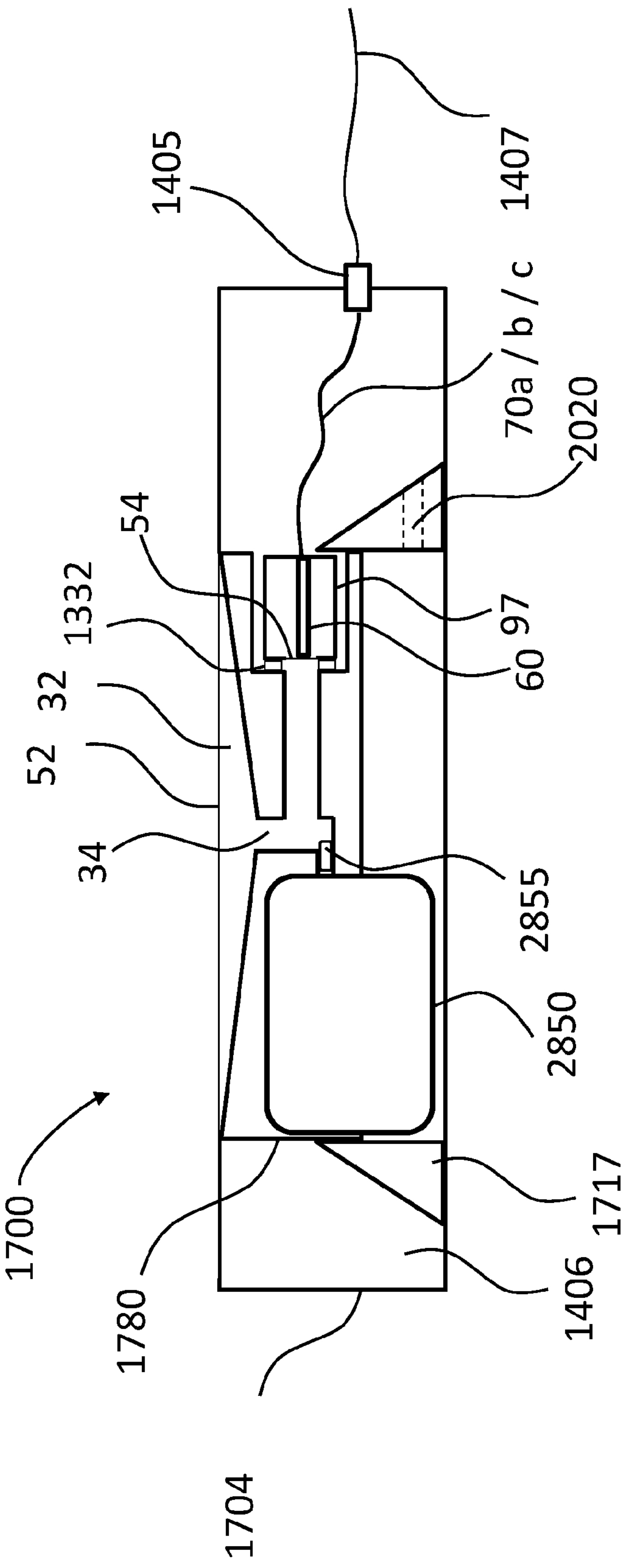

Again, the volume outside the transducer assembly can be the volume of the housing, which volume is bounded only by the housing, and limited by the components in the housing (the manifold, the transducer, etc.). That said, in an exemplary embodiment, a distinct volume can exist, such as tank 2850 seen in FIG. 28. Here, tank 2850 is partially located in the manifold, but can be located anywhere. Moreover, a plurality of tanks can be fluidically connected to each other to utilize additional space in the housing. Here, the passageway extends from the second portion 34 of the cavity 30. Located in the passageway is a porous element 2855 which functions according to the porous elements detailed above. By filling the passageway to the tank 2850 with the porous element, the transfer gas between the tank and the front volume can be slowed in accordance with the teachings detailed herein. Note that in this exemplary embodiment, the back volume is totally made up by the interior of the transducer 97.

Figure 29:
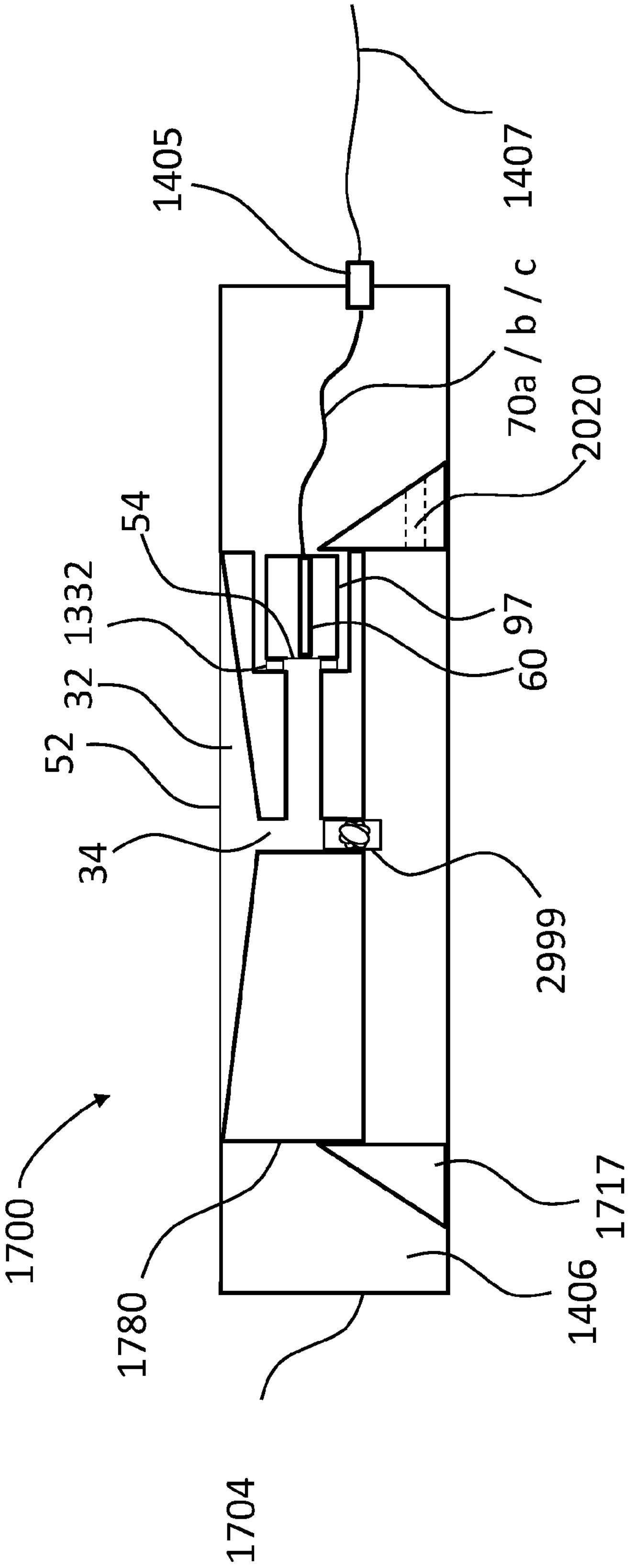

FIG. 29 presents an alternate exemplary embodiment where a peristaltic pump 2999 is utilized to meter the flow of gas into and out of the front volume. Here, the peristaltic pump is controlled by a microprocessor a chip based device or logic circuitry that receives data from a pressure sensor that monitors pressure within the front volume and/or the another volume (which could be the tank or could be the entire housing as referenced above). Upon a determination that the pressure has changed in the front volume or any other relevant volume, the peristaltic pump 2999 slowly transfers gas into or out of the front volume as it is utilitarian. A peristaltic pump can be utilized because such a pump can be utilized to carefully meter small amounts of gas into and out of the front volume. Accordingly, the peristaltic pump can be utilized to achieve any of the aforementioned time frames detailed herein.

Thus, in contrast to some of the embodiments where the device is configured to passively transfer gas between the chamber and a volume outside the transducer assembly (e.g., using the porous gasket, etc.), other embodiments are configured to actively transfer gas between the chamber and the volume outside the transducer assembly.

Thus, as can be seen above, the volume outside the transducer assembly is established by a main housing of the implantable microphone that envelopes the front volume and the transducer assembly, in some embodiments, and in some embodiments, is a volume that is established by the walls of the housing, at least in part, and in other embodiments, is a volume that is separate from that established by the housing.

In an exemplary embodiment, a surface area that establishes the another volume/bounds the another volume vis-à-vis gas tightness between the volume and other volumes other than those into which it is in fluid communication is at least 20, 25, 30, 35, 40, 45, 50, 55, 60, 65, 70, 75, 80, 85, 90, or 95 percent, or any value or range of values therebetween in 1% increments established by the inner surfaces of the walls of the housing of the implant. In the embodiments above, the inner surfaces of the walls have opposite surfaces that are exposed to the ambient environment. In an exemplary embodiment, a surface area that establishes the another volume/bounds the another volume vis-à-vis gas tightness between the volume and other volumes other than those into which it is in fluid communication is at least 20, 25, 30, 35, 40, 45, 50, 55, 60, 65, or 70 percent, or any value or range of values therebetween in 1% increments established by the manifold. In the embodiments above, the inner surfaces of the walls have opposite surfaces that are exposed to the ambient environment. In an exemplary embodiment, the manifold is a monolithic piece of metal or polymer that is machined or casted or formed to have the passageways detailed herein and/or variations thereof.

In an exemplary embodiment, the chamber 32 and otherwise the front volume, has a volume of less than or equal to 1, 1.5, 2, 2.5, 3, 3.5, 4, 4.5, 5, 5.5, 6, 6.5, 7, 7.5, or 8 $mm^3$, or any value or range of values therebetween in 0.1 $mm^3$ increments. The volume outside the transducer assembly to/from which gas is transferred from/to the chamber 32/front volume is greater than or equal to 25, 50, 75, 100, 125, 150, 175, 200, 225, 250, 275, 300, 350, 400, 450, 500, 550, or 600 $mm^3$, or any value or range of values therebetween in 1 $mm^3$ increments.

In some embodiments, the physical phenomenon that is harnessed to achieve the utilitarian value is that there is a relatively large volume of gas relative to the volume of gas of the chamber/the front volume. A pressure change in the chamber 32 that can be significant enough to change the transfer function of the microphone in a meaningful manner can be addressed by venting gas from the chamber into the larger volume in the case of a pressure increase or by drawing in gas to the chamber from the larger volume in the case of a pressure decrease. Depending on the size and dimension of the larger volume, the transfer of gas can occur in quantities that can return the chamber to a given pressure state or otherwise return the pressure in the chamber to a value where the transfer function of the microphone will no longer be meaningfully different relative to that which was the case prior to the pressure change (which can be the set transfer function/transfer function established for normal operation based on a statistical group, such as for use at the average atmosphere pressure between zero and 200 feet above sea level, as a large percentage of U.S. citizens live at such altitudes). In this regard, it is because of the relatively small volume of the front volume/chamber 32 that ambient pressure changes external to the microphone can impact the transfer function of the microphone. If the front volume was relatively large relative to the values detailed above, the pressure changes would not have such an impact on the transfer function, all other things being equal. However, creating a large front volume would reduce the sensitivity of the overall microphone system. And this is why in the embodiments detailed above, transfer of gas between the front volume and the larger volume, such as the volume of the housing, is controlled so that such does not occur to quickly. If the transfer of gas could occur quickly, the volume of the housing would effectively be part of the front volume. But because of the porous gasket for example, the larger volume of the housing is not part of the front volume/is isolated from the front volume, even though the two volumes are in fluid communication with each other. Thus, there is a front volume that has ready access to a supply of gas from a volume many times the size of the front volume and has access to a repository for gas in the front volume that is many times the size of the front volume, while the front volume is effectively a closed volume for purposes of sensitivity of the microphone. This as compared to, for example, what would be the case if the porous gasket was not present and a route between the front volume and the other volume was established by a passageway with an area of 3 $mm^2$ for example (a cylindrical passageway with a 1 mm radius for example).

In this regard, the another volume, such as the volume of the housing, is analogous to/can be considered gas reservoir/overflow volume. This as compared to an expanded front volume or an expanded back volume. That is, just as an automobile radiator can have an overflow, that does not make it an expanded radiator. Thus, for example, by making the passage 2010 small enough, the housing volume is not part of the front volume/is not an expanded front volume. The same is the case with making the passage 2070 small enough so that the housing volume is not part of the back volume/is not an expanded back volume. Conversely, if one makes the holes large enough/increases the porosity of the gasket enough, the housing volumes can become a front or back volume. Embodiments can be implemented to prevent this (effectively isolate the front volume and back volume to those of the pertinent chambers and not the housing). In this regard, if the fluid communication maintains sufficient sensitivity for the microphone to operate in a utilitarian efficacious manner, the volumes have not been expanded.

Thus, by slowing the transfer of gas between the volumes the best of both worlds can be achieved. The limited relative small front volume can be effectively maintained while also permitting gas transfer from that volume to a much larger volume so as to adjust the pressure within the front volume.

And this can also be the principle of operation with respect to the passageway 2010. In an exemplary embodiment, the passageway 2010 and the other passageways are of sufficiently narrow area that gas transfer occurs relatively slowly so as to effectively maintain the front volume as a closed volume even though the front volume is in fluid communication with the larger volume of the housing. By way of example only and not by way of limitation, in an exemplary embodiment, the passageway 2010 is a cylindrical passageway with a diameter (which can be the smallest diameter—the arrangement could be a conical passageway that narrows to the smallest diameter and then widens again—in some embodiments, it is the smallest diameter that controls) of less than or equal to 0.025, 0.05, 0.75, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4, 4.5, 5, 5.5, or 6 micrometers or any value or range of values therebetween in 0.01 micrometers. If the diameter of the passageway is sufficiently small (if the area of the passageway is sufficiently small), this can slow the transfer of gas between the volumes sufficiently so as to effectively create a closed front volume even though there is fluid transfer between the front volume and the larger volume.

A similar principle of operation (including same) can exist if the opening 2720 in the transducer housing is sufficiently small (again, along the lines of the aforementioned values for example). If gas can be transferred between the inside of the housing of the transducer 97 and the front volume and that gas can be transferred between the inside of the housing the transducer 97 and the volume of the housing of the microphone or otherwise the other large volume, gas can be transferred between the front volume and the larger volume indirectly through the transducer 97 (through the housing of the transducer 97). In this exemplary embodiment, by slowing the transfer of gas between the housing of the transducer 97 and the larger volume of the housing of the implants, the front volume can still be effectively a closed volume concomitant with the embodiments above. And in a similar vein to how the gasket/tiny passage between the chamber 32 and the larger volume does not effectively expand the front volume/effectively maintains a closed front volume, the tiny passage 2720/tiny opening 2720 does not expand the back volume/effectively maintains a closed back volume.

Figure 30:
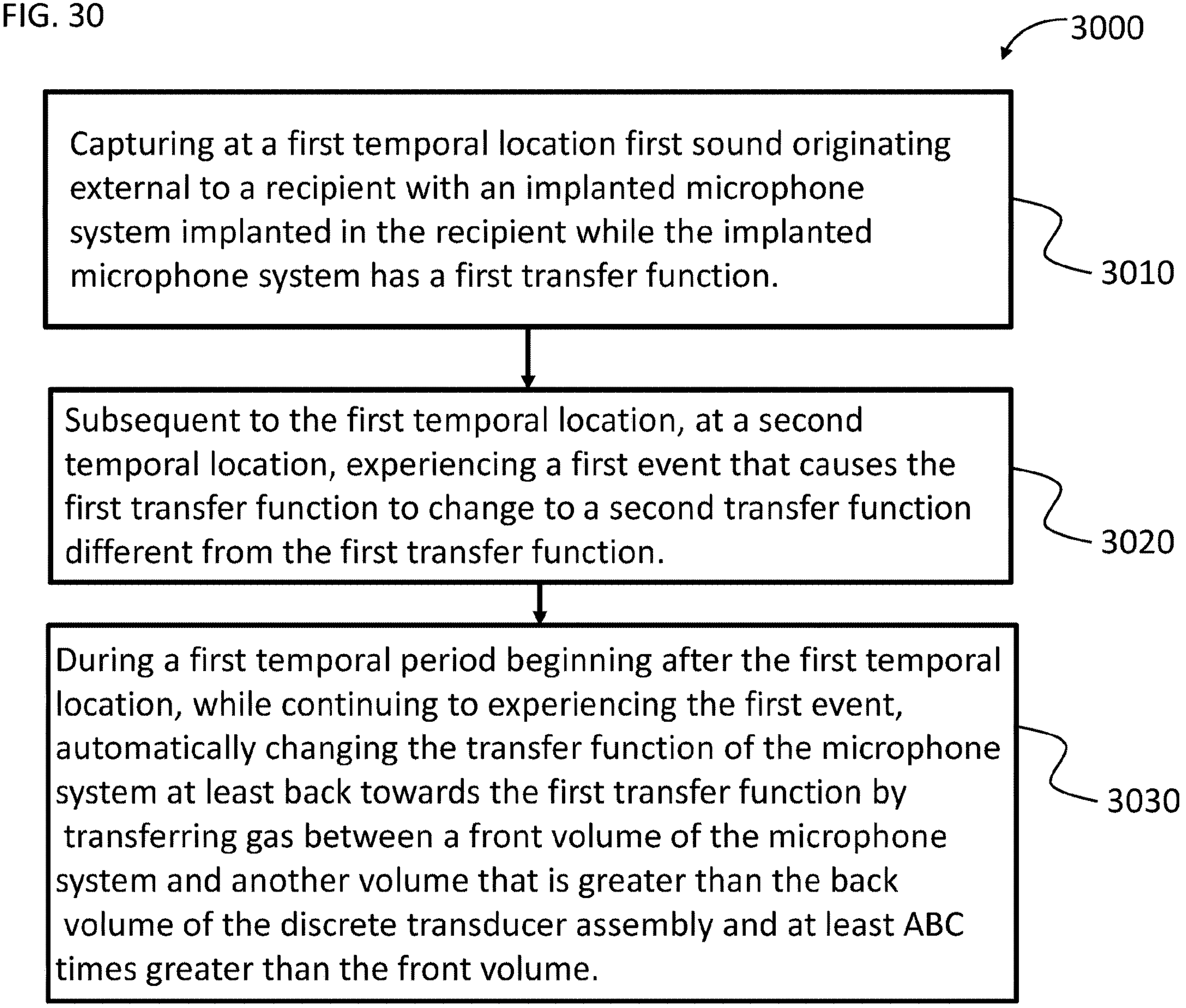
FIGS. 30 and 31 depict exemplary flowcharts according to exemplary embodiments.

FIG. 30 presents an exemplary algorithm for an exemplary method, method 3000, according to an exemplary embodiment. Method 3000 includes method action 3010, which includes the action of capturing at a first temporal location first sound originating external to a recipient with an implanted microphone system implanted in the recipient while the implanted microphone system has a first transfer function. By way of example only and not by way of limitation, this can correspond to a transfer function of the implanted microphone system that corresponds to a balanced pressure in the front volume and the back volume (e.g., a pressure of 5 units in the front volume and a pressure of 5 units in the back volume). Method 3000 also includes method action 3020, which includes, subsequent to the first temporal location, at a second temporal location, experiencing a first event that causes the first transfer function to change to a second transfer function different from the first transfer function. In an exemplary embodiment, this second temporal location can be a location 10 minutes after the first temporal location, and the event can be, for example, the pressurization of a commercial aircraft which reduces the ambient pressure by a certain amount. In an exemplary embodiment, the transfer function is a function of pressure imbalance. In such an exemplary scenario, the ambient pressure on the skin of the recipient would thus be reduced, and the diaphragm 52 could bow outward away from the front volume, and thus reduce the pressure in the front volume (e.g., a pressure of 4.8 units in the front volume in a pressure of 5 units in the back volume). Thus, a pressure imbalance between the front volume and the back volume would exist, which would change the transfer function of the microphone system from the first transfer function to the second transfer function.

Method 3000 further includes method action 3030, which includes, during a first temporal period beginning after the first temporal location, while continuing to experiencing the first event, automatically changing the transfer function of the microphone system at least back towards the first transfer function by transferring gas between a front volume of the microphone system and another volume that is greater than the back volume of the discrete transducer assembly and at least and/or equal to ABC times greater than the front volume. In an exemplary embodiment, this can include, for example, using the gasket embodiments above, which would adjust while the aircraft is pressurized, and thus adjust during a temporal period while continuing to experience the first event. In an exemplary embodiment, at least in some instances, upon returning the pressure back to the original pressure in the front volume and/or upon the cessation of transferring the gas, the transfer function of the implantable microphone system would be that which was the case at the first temporal location. In an exemplary embodiment, at least in some instances, transfer function of the implantable microphone might be different from that which was the case at the first temporal location, but still much closer to that which was the case at the first temporal location than that which would be the case in the absence of the gas transfer teachings detailed herein and/or variations thereof.

In an exemplary embodiment, ABC is 2, 3, 4, 5, 6, 7, 8, 9, 10, 11, 12, 13, 14, 15, 20, 25, 30, 35, 40, 45, 50, 55, 60, 65, 70, 75, 80, 90, 100, 110, 120, 130, 140, 150, 160, 170, 180, 190 or 200, 225, 250, 275, 300, or 400, or any value or range of values in 0.1 increments. And in some embodiments, this can be a maximum ratio (e.g., the large volume is no more than 200 times the front volume).

In some exemplary embodiments, the first event lasts more than at least 10, 15, 20, 25, 30, 35, 40, 45, 50, 55, 60, 75, 90, 105 seconds, 2 minutes, 2.5, 3, 3.5, 4, 4.5, 5, 5.5, 6, 6.5, 7, 7.5, 8, 9, 10, 11, 12, 13, 14, 15, 20, 25, 30, 35, 40, 45, 50, 55 or 60 minutes or more at a steady state. In at least some exemplary embodiments, within a time period about half of any of the aforementioned values (e.g., 5, 7.5, 10, 12.5, 15, 17.5, 20, 22.5, 25 seconds, etc.), while continuing to experience the first event, method 3000 further includes the action of automatically changing the transfer function of the microphone to effectively B % of the way back to the first transfer function via the transfer of gas, where B can be 50, 55, 60, 65, 70, 75, 80, 85, 86, 87, 88, 89, 90, 91, 92, 93, 94, 95, 96, 97, 98, 99, or 100.

In view of the teachings above, it is clear that in some embodiments, the microphone system that is the subject of method 3000 is part of a hearing prosthesis that includes an implanted noise cancellation system, such as any of the noise cancellation systems detailed above or variations thereof. Also consistent with the teachings detailed above, the noise cancellation system includes an algorithm that cancels feedback, which algorithm is at least partially dependent on the transfer function of the microphone and which algorithm accommodates changes in the transfer function of the microphone. In some embodiments associated with the execution of method 3000, the pressure management system has prevented the noise cancellation system from chasing the changes in the transfer function of the microphone between the first temporal location and an end of the first temporal period. Some additional features of such will be described below.

Also, it is noted that the pressure management systems detailed herein and variations thereof can be utilized while the microphone is functioning to capture sound. Accordingly, in an exemplary embodiment of the method 3000, sound is captured during the first temporal period while the pressure is managed.

Some embodiments are such that the pressure management of method 3000 is practiced utilizing passive equalization methods. That is, the pressure management of method 3000 includes passively transferring gas between the front volume and the other volume. Thus, in an exemplary embodiment, the transferring of gas is executed by passive transfer between the front volume and the another volume bypassing a back volume of the microphone system. With respect to the embodiment with the passage in the transducer, the transferring of gas is executed by passive transfer between the front volume and the another volume by transferring gas through the back volume of the microphone system. That said, some embodiments utilize active transfer of gas using the peristaltic pump for example detailed above.

In an exemplary embodiment of method 3000, sound is captured during the first temporal period, the sound capture causing a diaphragm 52 of a transducer 97 of the microphone system to vibrate, and, with the exception, if present, of a path into the transducer 97 through the diaphragm 52, the another volume is fluidically isolated from a back volume of the microphone system.

In an exemplary embodiment, the action of transferring gas between the front volume and the another volume is executed by transferring gas through an element that slows the gas transfer by at least and/or equal to and/or no greater than XYZ times relative to that which would be the case without the use of the element, all else being equal. For example, if the gasket was removed, but the space taken up by the gasket remains, the gasket could slow the gas transfer by at least XYZ through that space. In some embodiments, XYZ can be 10, 11, 12, 13, 14, 15, 20, 25, 30, 35, 40, 45, 50, 55, 60, 65, 70, 75, 80, 90, 100, 110, 120, 130, 140, 150, 160, 170, 180, 190 or 200, 225, 250, 275, 300, 400, 450, 500, 550, 600, 700, 800, 900, 1000, 1250, 1500, 1750, 2000, 2500, 3000, 3500, 4000, 4500, 5000, 6000, 7000, 8000, 9000, 10000, 12500, 15000, 17500, 20000, 25000, 30000, 35000, or 40000, or any value or range of values in 1 increments.

In an embodiment, the implantable microphone is configured so that the pressure equalization is achieved via gas transfer between the front volume and the another volume through the route, wherein an element retards the gas transfer (e.g., porous body, as distinct from a narrow passage for example). In this embodiment, the microphone would not work in the absence of the element, all else being equal. (Reference the above where the gasket was not present, and the space taken up by the gasket remained, the sensitivity of the microphone would decrease.) In an exemplary embodiment, the absence of the gasket for example reduces the sensitivity of the implantable microphone by at least and/or equal to 25, 30, 35, 40, 45, 50, 55, 60, 65, 70, 75, 80, 85, 90, 95, 96, 97, 98, 99, or 100%, or any value or range of values therebetween in 0.1% increments, relative to that which would be the case in the presence of the gasket. That is, one can test for this by removing the gasket and keeping everything else the same.

In an exemplary embodiment, the another volume is at least a number of times larger than the front volume (any of the values detailed herein) and the device is configured so that gas transfer between the front volume and the another volume to enable pressure equalization has an impact on acoustic sensitivity, if at all, of the microphone system so as to retain an efficacy of the microphone system. Thus, it could be that sensitivity is decreased, but the microphone still has efficacy (by analogy, a drug past its designated shelf life still may have efficacy, but it is not as potent as that which was the case when manufactured).

Figure 31:
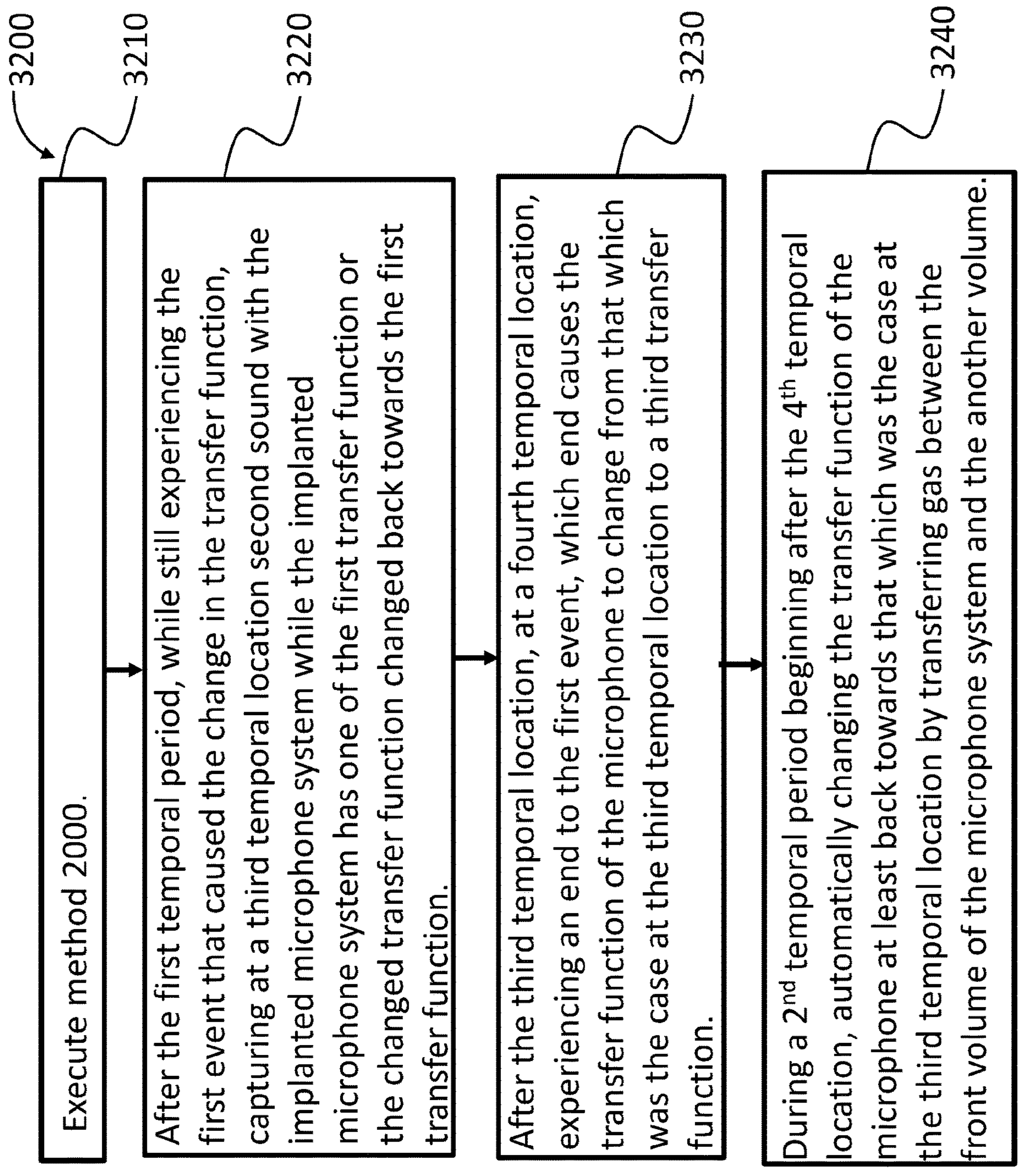
Figure 32:
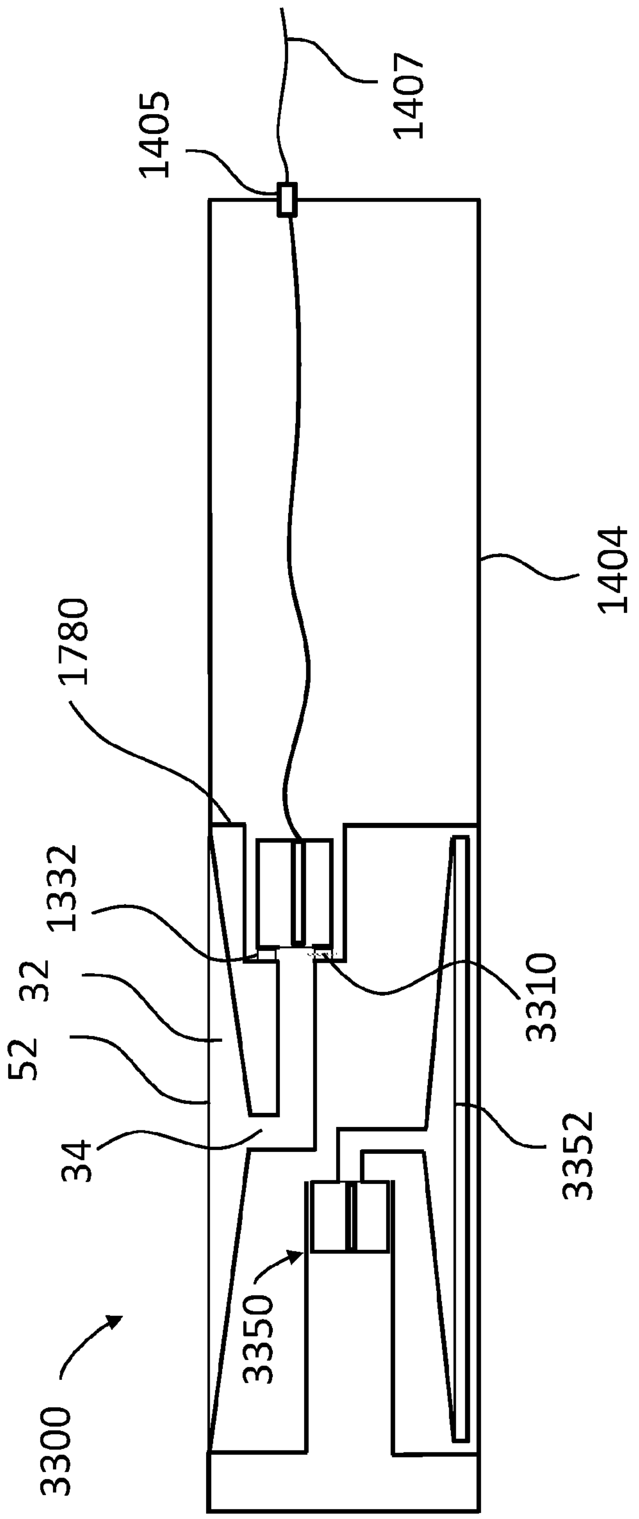
FIGS. 32-34 depict some exemplary embodiments in which some teachings herein can be utilized.

FIG. 31 presents a flowchart for another exemplary method, method 3200. Method 3200 includes method action 3210, which includes executing method 3000. Method 3000 further includes method action 3220, which includes, after the first temporal period, while still experiencing the first event that caused the change in the transfer function, capturing at a third temporal location second sound with the implanted microphone system while the implanted microphone system has one of the first transfer function or the changed transfer function changed back towards the first transfer function. In an exemplary embodiment, the first sound can be the voice of a passenger, for example, sitting to the right of the recipient of the implanted microphone, while the passenger is discussing the results of a baseball game aired the night before on television, and the second sound can be the voice of the passenger while the passenger is discussing the news coverage of the baseball game, where the third temporal location is after the plane has taken off, whereas the first temporal location is while the plane was sitting on the tarmac prior to the cabin doors of the aircraft being shut and sealed and the aircraft pressurization system being activated. Method 3200 further includes method action 3230, which includes, after the third temporal location, at a fourth temporal location, experiencing an end to the first event, which end causes the transfer function of the microphone to change from that which was the case at the third temporal location to a third transfer function. By way of example only and not by way of limitation, the fourth temporal location can be at a point where the aircraft has landed. In an exemplary embodiment, the aircraft took off from a city located substantially at sea level, such as, for example, Washington, D.C. Reagan National Airport, and landed, for example, at Denver Airport in Denver, Colorado, which is about a mile above sea level, and thus has an ambient pressure that is different than that from Washington, D.C. And thus, the end of the first event of method action 3230 is a result of, for example, the cabin doors opening and the pressurization system of the aircraft being shut down, and thus the pressure within the aircraft changing to that of the pressure at the Denver airport. Method 3200 further includes method action 3240, which includes, during a second temporal period beginning after the fourth temporal location, automatically changing the transfer function of the microphone at least back towards that which was the case at the third temporal location by transferring gas between the front volume of the microphone system and the another volume. In an exemplary embodiment, this can correspond to adjusting the pressure within the microphone system to accommodate the fact that the ambient pressure is now that which corresponds to a mile above sea level as opposed to that which corresponds to 8,000 feet above sea level which is the pressurization of a cabin of an aircraft. Accordingly, it can be understood that in at least some exemplary embodiments, there is utilitarian value with respect to not fully changing the transfer function of the microphone system back to that which was the case at the beginning of the first event.

As noted above, embodiments of the teachings herein can correspond to a hearing prosthesis, comprising an implantable microphone system and an implantable noise cancellation system (or, as some may describe, a sound capture sub-system of an implantable microphone system, and a noise cancellation system of the implantable microphone system, depending on the terminology one uses). FIG. 23 depicts an exemplary embodiment of such an implantable microphone system 2300. In this embodiment, microphone 2300 corresponds to the microphones detailed above (here, there is a microtube 3310 through the adhesive 1332 (the microtube can be embedded in the adhesive at manufacturing the microtube can have the inner diameters of the passages detailed above) to enable fluid transfer between the housing body volume and the chamber 32), but with the addition of a noise cancellation system 2350 (which can correspond to the accelerometer/motion sensor 71 detailed above). In an exemplary embodiment, noise cancellation system 3350 corresponds to any of the noise cancellation systems detailed above and/or variations thereof. It is noted that microphone 3300 can correspond to microphone 12/412 above and motion sensor 71/accelerometer 470 detailed above, as a single unit (i.e., can correspond to transducer system 480). In this embodiment, the noise cancellation system 2350 is also supported by the manifold body 1780. As can be seen, noise cancellation system 3350 includes components that generally correspond to the components of the sound capture system. In this regard, the noise cancellation system 3350 includes a front volume that is in fluid communication with a diaphragm 3352, which front volume extends to a transducer microphone element assembly that has a back volume. The transducer microphone element assembly can correspond to that of the sound capture system. A difference between the noise cancellation system and the sound capture system is that the diaphragm 3352 is isolated from sound of the ambient environment, as opposed to the diaphragm 52 of the sound capture system. Accordingly, the diaphragm 3352 vibrates or otherwise moves with vibration/movement of the housing 1404, but not due to sound. Conversely, diaphragm 52 moves or otherwise vibrates as a result of the vibration/movement of the housing 1404, in addition to vibration resulting from sound. Not shown are the signal lines output from the transducer microphone element assembly of the noise cancellation system which lead to the microphone system so that the noise cancellation system can cancel at least in part part of the signal that is outputted from the transducer microphone element assembly of the sound capture system.

In some embodiments of such embodiments, the hearing prosthesis is configured to evoke a hearing percept based on frequencies above a given frequency (e.g., 100 Hz, 60 Hz, etc.) captured by the microphone system and adjust the noise cancellation system transfer function to accommodate for changes in an environment of the recipient (e.g., pressure changes owing to the movement of a weather front, pressure changes owing to the fact that the recipient is swimming, etc.). In some exemplary embodiments, the implantable microphone is configured to adjust a pressure within a microphone volume in a timeframe fast enough that the adjustment accommodates the noise cancellation system and slow enough that the adjustment accommodates the microphone system. Accordingly, in an exemplary embodiment, this can avoid a scenario where the pressure management system "chases" the noise cancellation system.

In some embodiments of this hearing prosthesis, the hearing prosthesis is configured to evoke a hearing percept based on a time constant corresponding to more than P Hz and adjust the noise cancellation system transfer function to accommodate the change in the environment within about V of an hour, where P can be 30, 35, 40, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 85, 90, 95 or 100, and V is 0.05, 0.1, 0.15, 0.2, 0.25, 0.3, 0.35, 0.4, 0.45, 0.5, 0.55, 0.6, 0.65, 0.7, 0.75, 0.8, 0.9, 1.0, 1.1, 1.2, 1.3, 1.4, or 1.5.

Based on the above, it can be seen that the implantable microphone system of some embodiments can include a first transducer (e.g., the transducer microphone element assembly of the sound capture system) and a first chamber in which a gas is located such that vibrations originating external to the microphone are effectively transmitted therethrough, wherein the first transducer is in effective vibration communication with the gas, wherein the transducer is configured to convert the vibrations traveling via the gas to a first electrical signal. Further, the first chamber corresponds to a first front volume of the microphone system, and the first transducer includes a first back volume corresponding to the first back volume of the transducer system.

Further, in this exemplary embodiment, the implantable noise cancellation system includes a second transducer (e.g., the transducer microphone element assembly of the noise cancellation system) and a second chamber in which a gas is located such that vibrations originating external to the microphone are effectively transmitted therethrough. Consistent with the above-noted theory of operation of the noise cancellation system, the second chamber is at least substantially isolated from noise vibrations that are captured by the microphone system. The second transducer is in effective vibration communication with the gas of the second chamber, and the second transducer is configured to convert the vibrations traveling via the gas of the second chamber to a second electrical signal. Here, the second chamber corresponds to a second front volume of the noise cancellation system (where "second" is used for naming purposes only, there are not "two" front volumes of the noise cancellation system). In this embodiment, the hearing prosthesis is configured to enable pressure adjustment of the first front volume in real time (e.g., using any of the embodiments detailed herein, whether active or passive).

In some embodiments, the first front volume is fluidically isolated from the second front volume such that the pressure adjustment in the first front volume does not adjust the pressure of the second front volume. Indeed, in an exemplary embodiment, the front volume of the noise cancellation system does not have any fluid transfer therefrom (save for leakage) other than potentially fluid transfer with the back volume thereof, and the back volume thereof does not have any fluid transfer (save for leakage) other than the potential transfer with the front volume of the noise cancellation system. In some embodiments, the first back volume is fluidically isolated from the second back volume. The above said, the second front volume can have the fluid transfer arrangement of the first front volume in some embodiments.

In some embodiments, the hearing prosthesis is configured such that the pressure adjustment does not impact effective operation of a feedback mitigation algorithm of the hearing prosthesis (i.e., there can be some impact, but the feedback mitigation algorithm is not effectively impacted/the feedback mitigation algorithm will continue to be effective). In at least some exemplary embodiments of such, this prevents or otherwise mitigates the above-noted phenomenon where the feedback management system chases the transfer function of the microphone. In at least some exemplary embodiments, the results of the feedback mitigation algorithm of the hearing prosthesis is the same as if the pressure management system was not present or otherwise not functional. In an exemplary embodiment, the results of the feedback mitigation algorithm are at least a 70, 75, 80, 85, 90, 91, 92, 93, 94, 95, 96, 97, 98, 99 or 100% reduction in noise relative to that which would be the case in the absence of the operation of the feedback mitigation algorithm when the pressure management system is functioning. In an exemplary embodiment, the time that it takes the feedback mitigation algorithm to converge on a set of filter coefficients to be applied to eliminate/reduce feedback is no more than 75, 70, 65, 60, 55, 50, 45, 40, 35, 30, 25, 24, 23, 22, 21, 20, 19, 18, 17, 16, 15, 14, 13, 12, 11, 10, 9, 8, 7, 6, 5, 4, 3, 2 1 or 0% longer than that which would be the case in the absence of the pressure management system functioning.

It is noted that in some embodiments, the back volume(s) are zero compliance back volume.

Figure 33:
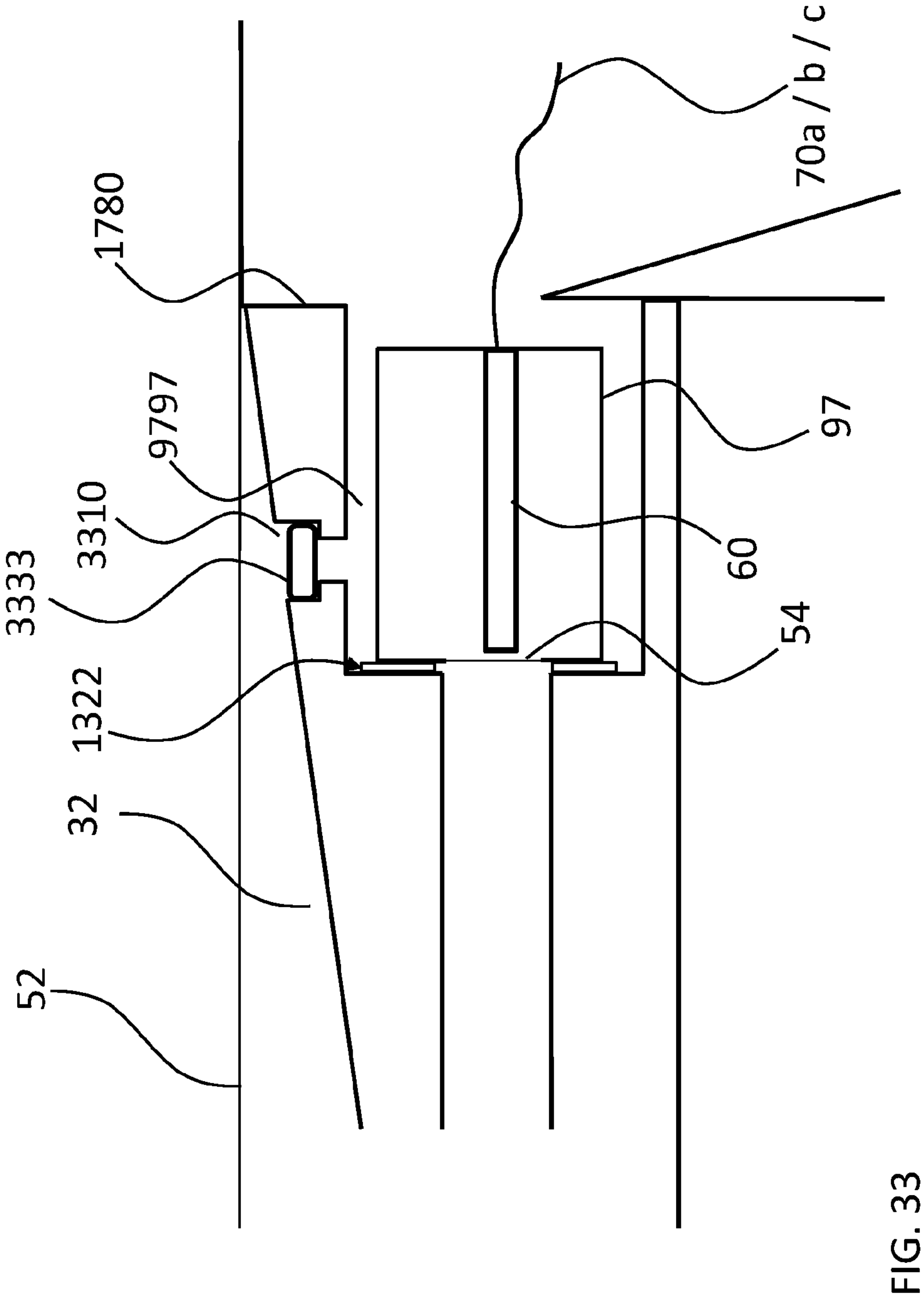
Figure 34:
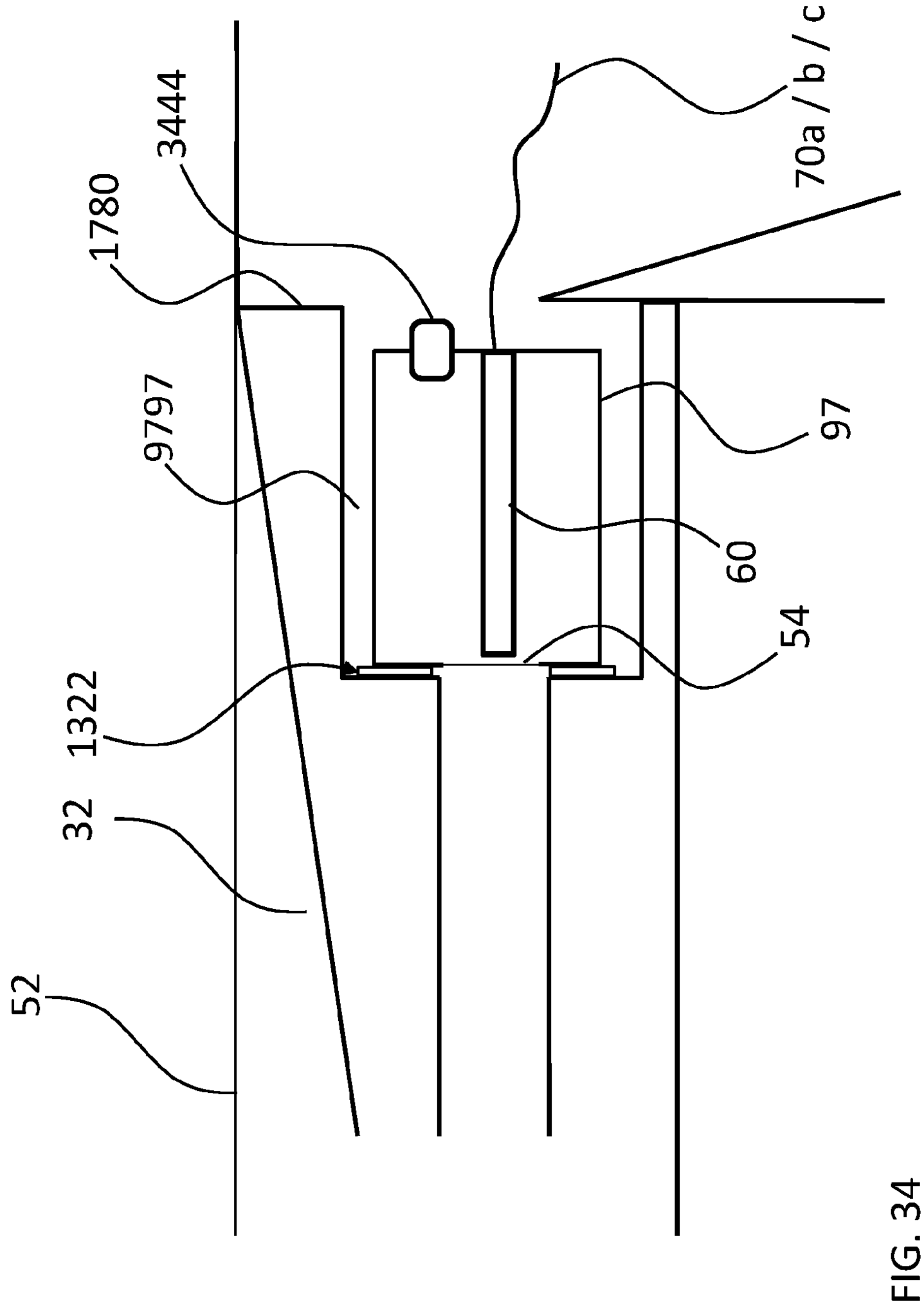

FIG. 33 presents another embodiment where an oversize passage 3310 is oversized compared to the passage 2210 (e.g., 1 mm in diameter at its narrowest for passage 3310). Here a porous body 3333 is put into the passage 3310 to slow the transfer of fluid from chamber 32 to the volume of the housing. In a similar vein, a large passage can be placed into the housing of transducer 97, and can be "plugged" with a porous body 3444, as seen in FIG. 34. This can permit fluid transfer in a slowed manner while using a larger passage (the passage could be 1 or 2 mm, for example). Alternatively, and/or in addition to this, the porous material could be a putty or the like that can simply cover the opening.

FIGS. 5-8 show various depictions of porous elements that can be used to slow the gas transfer between the volumes in some embodiments. The small/tiny dimensioned elements corresponding to the openings in the element.

It is noted that for more porous elements, the area "blocked" by the porous elements would be smaller than less porous elements, to achieve the same flow rate, all else equal. In an exemplary embodiment, a gas transfer rate for Helium (and such can be scaled for other gases—helium is the gas of the volumes in some embodiments) is 1E-3 to 1E-4 mbar/sec. In an exemplary embodiment, the transfer rate is less than and/or equal to 0.01, 0.009, 0.008, 0.007, 0.006, 0.005, 0.004, 0.003, 0.002, 0.001, 0.0009, 0.0008, 0.0007, 0.0006, 0.0005, 0.0004, 0.0003, 0.0002, 0.0001, 0.00009, 0.00008, 0.00005, 0.00002, 0.00001, 0.000005, 0.000001 mbar/sec, or any value or range of values therebetween in 0.000001 mbar/second increments. In an exemplary embodiment, the transfer rate is greater than 0.001, 0.0009, 0.0008, 0.0007, 0.0006, 0.0005, 0.0004, 0.0003, 0.0002, 0.0001, 0.00009, 0.00008, 0.00005, 0.00002, 0.00001, 0.000005, 0.000001 mbar/sec, or any value or range of values therebetween in 0.000001 mbar/second increments.

Figure 10:
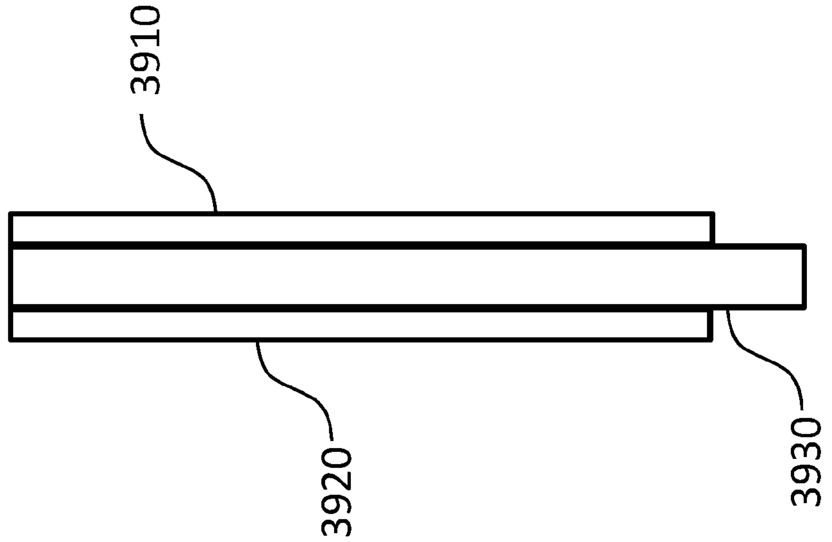
FIGS. 9 and 10 depict some assemblies used in some embodiments.

FIGS. 9 and 10 depict front and side views of a variation of the securement apparatus 2432. This embodiment uses a rectangular arrangement (instead of a circular gasket/adhesive arrangement contemplated above). Here there are two acrylic adhesive transfer tapes (by way of example) 3910 and 3920 having a thickness of F mm (the horizontal direction of FIG. 40). There is also a woven polyolefin synthetic material (for example—any sufficiently) having a thickness of G mm. In an embodiment, F can be 0.01, 0.02, 0.03, 0.04, 0.05, 0.06, 0.07, 0.08, 0.09, 0.1, 0.125, 0.15, 0.175, or 0.2, or any value or range of values therebetween in 0.001 increments. In an embodiment, G can be 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.3, 0.35, 0.4, 0.45, or 0.5, or any value or range of values therebetween in 0.001 increments. FIG. 9 depicts a side view with adhesive 3920 not shown for clarity. The through hole 3935 through the woven material can be seen, which through hole enables unobstructed communication with the membrane 54 of the transducer from the front volume. In this exemplary embodiment, owing to the thickness of the woven material, the gas transfer occurs in a direction normal to the plane shown in FIG. 9 (the gas goes through the interior of the "cylinder" formed by the hole, doglegs through the interior surface and then into the "wall" (the porous material). The adhesive prevents gas flow upwards and downwards (in the of frame of reference of FIG. 9). In an exemplary embodiment where the porous material is. 15 mm thick, the area for the gas to enter the porous body is the surface area of the cylinder having a height of 0.15 mm (the top and bottom of the cylinder are not counted in the area, as that is a through passage from the front volume to the membrane/diaphragm of the transducer. The diameter of the hole is about 1 mm. The dashed line is the hole for the adhesive, which can be about 1.5 mm (when used with the contemplated transducer—other dimensions will be used in some embodiments). Here, the adhesive layers can be used to secure the porous material to the transducer/manifold. The assembly shown in the figures can be put on the face of the transducer 97 facing the front volume, and then the transducer with the assembly D1 can be 1, 1.1, 1.2, 1.3, 1.4, 1.5, 1.6, 1.7, 1.8, 1.9, 2, 2.1, 2.2, 2.3, 2.4 or 2.5 or any value or range of values therebetween in 0.005 mm increments. W1 can be 2, 2.1, 2.2, 2.3, 2, 2.5, 2.6, 2.7, 2.8, 2.9, 3, 3.1, 3.2, 3.3, 3.4, 3.5, 3.6. 3.7, 3.8, 3.9 or 4 mm or any value or range of values therebetween in 0.005 mm increments. The width and/or the thickness and/or the height and/or the location of the through hole of the porous body, along with the porosity of the material, can influence/control the transfer rate of the gas. Embodiments include sizing the assembly to achieve the desired gas transfer rate.

In an exemplary embodiment, the length of the path influences the speed of pressure change, or more accurately, the length of the path that is "constricted" influences the speed of pressure change. By way of example, with reference to the passage, for a given diameter, a shorter passage will results in a faster change than a longer passage, at least with respect to passage diameters that are sized and dimensioned to effectively slow fluid transfer (a 1 mm diameter passage will not have a meaningful impact on the speed of fluid transfer, whether that is 1 mm or 5 mm long for example). In this regard, in an exemplary embodiment, the length of the passageway/small diameter hole can be from 0.5 mm to 2 mm for example, or longer. In an embodiment, the length of the passageway can be equal to or greater than and/or less than 0.4, 0.45, 0.5, 0.6, 0.7, 0.8, 0.9, 1.0, 1.1, 1.2, 1.3, 1.4, 1.5, 1.6, 1.7, 1.8, 1.9, 2, 2.1, 2.2, 2.3, 2.4, 2.5, 2.75 or 3 mm or greater or any value or range of values therebetween in 0.01 mm increments. This can also be the case with respect to the shortest path through the gasket material. With respect to the embodiment of FIG. 9, this would be the path upward/in the vertical direction (in an embodiment where the drawing is to scale). If the porous element 3930 was narrower for example, and/or if the through hole 3935 was downward more, the shortest path might be to the left or right or both. In an exemplary embodiment, that can be the path that controls the speed.

And in an exemplary embodiment, the entirety of the area around the through hole 3935 need not be porous. In an exemplary embodiment, a quarter, a half, two thirds, three quarters, etc. of the area there about can be porous, and the other half is nonporous.

In an exemplary embodiment, the gasket is a microporous body that is dimensionally stable, that is highly filled. In an embodiment, the porous material is 30, 35, 40, 45, 50, 55, 60, 65, 70, 75 or 80% or any value or range of values therebetween in 1% increments air by volume. In an exemplary embodiment, the grammage ($g/m^2$) is 70, 75, 80, 85, 90, 95, 100, 110, 120, 130, 140, 150, 160, 170, 180, 190, 200, 210, 220, 230, 240 or 250 or any value or range of values therebetween in 1 increment, and the density ($g/cm^3$) is 0.5, 0.55, 0.6, 0.65, 0.7, 0.75, 0.8, 0.85, or 0.90 or any value or range of values therebetween in 0.01 increments.

In an exemplary embodiment, a porosity of the porous material is less than and/or equal to 10ˆ−3, 10ˆ−4, 10ˆ−5, 10ˆ−6 or 10ˆ−7 mbar·L/s or any value or range of values therebetween in 10ˆ−8 mbar·L/s increments. In an exemplary embodiment, at least and/or equal to 0.15, 0.3, 0.5, 0.7. 0.9, 1, 1.25, 1.5, 1.75, 2, 2.5, 3, 3.5, 4, 4.5, 5, 6, 7, 8, 9, 10, 11, 12, 13, 14, 15, 16, 17, 18, 19, 20, 25, 30, 35, 40, 45 or 50 cubic millimeters of the porous material are present through which the gas travels to reach the other volume.

In an exemplary embodiment, the teachings herein can enable deflection of the diaphragm 52 to be more stable over time. For example, say a pressure decrease in ambient pressure occurs. The diaphragm 52 will bow outward a first amount, but over time, such as days, weeks or any of the time periods detailed herein where the front volume is not in fluid communication with the back volume, but tolerance leakage occurs, the diaphragm 52 will continue to bow outward. This will continually change the transfer function of the microphone. Conversely, using the fluid transfer techniques detailed herein, that final bowing will be arrived at much sooner (minutes or the times detailed herein detailed for the embodiment using the fluid transfer). This will result in a stable transfer function after the final bowing is arrived at. This is thus a more stable tensioning on the diaphragm over time. That is, by permitting the diaphragm 52 to reach its steady state point more quickly, there is utilitarian value in such. By way of example, a pressure decrease of 27% within 7, 6, 5, 4, 3, 2, or 1 minutes (which can occur in a linear manner over those times) in ambient atmosphere will result in the diaphragm 52 reaching a steady state equilibrium point (tension) and/or a value within 10, 9, 8, 7, 6, 5, 4, 3, 2 or 1% of the steady state value (tension) no faster than and or equal to 30, 45, 60, 75, 100, 125, 150, 175, 200, 250, 300, 350, 400, 450, 500, 550, 600, 700, 800, 900, 1000, 1250, 1500, 1750, 2000, 2500, 2750 or 3000 seconds or any value or range of values therebetween in 1 second increments and no slower than 60, 75, 100, 125, 150, 175, 200, 250, 300, 350, 400, 450, 500, 550, 600, 700, 800, 900, 1000, 1250, 1500, 1750, 2000, 2500, 2750, 3000, 3250, 3500 seconds or any value or range of values therebetween in 1 second increments.

It is noted that any one or more teachings detailed herein can be combined with any other one or more teachings detailed herein in at least some exemplary embodiments, unless otherwise specifically excluded or unless the art does not enable such. It is noted that any one or more teachings detailed herein can be specifically excluded from combination with any other one or more teachings detailed herein in at least some exemplary embodiments, unless otherwise noted or unless the art does not enable such. Any disclosure of an apparatus herein or a system herein corresponds to a disclosure of a method of utilizing such. Any disclosure of a method action herein corresponds to a disclosure of a system and/or a device configured to execute such method actions unless otherwise specified or unless the art does not enable such. Any disclosure of a manufacturing operation herein corresponds to a disclosure of an apparatus that results from such manufacturing operation, and any disclosure of an apparatus herein corresponds to a disclosure of a method of making such apparatus. Any device, system, and/or method that can enable the teachings detailed herein to be practiced can be utilized in at least some exemplary embodiments to implement the teachings herein. Any element or action herein can be not present in an exemplary embodiment.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A device, comprising:

a transducer assembly; and a chamber in which a gas is located such that vibrations originating external to the device based on sound are effectively transmitted therethrough, wherein the device is an implantable microphone, the transducer assembly is in effective vibration communication with the gas, wherein the transducer assembly is configured to convert the vibrations traveling via the gas into an electrical signal, the chamber and the transducer assembly are part of a microphone system of the implantable microphone, wherein the chamber corresponds to a front volume of the microphone system, and the transducer assembly includes a back volume corresponding to at least part of a back volume of the microphone system, and the implantable microphone is configured to purposely enable pressure equalization of the front volume with another volume within the implantable microphone in real time and/or within a time period substantially faster than tolerance leakage between the front volume and the another volume via a route that bypasses a back volume of the microphone system.

2. The device of claim 1, wherein:

the route extends through a porous structure that significantly slows gas transfer between the front volume and the another volume.

3. The device of claim 1, wherein:
the device includes a manifold that supports and/or establishes at least part of the front volume; and
a porous gasket is located between the transducer assembly and the manifold, the route extending through the porous gasket.

4. The device of claim 1, wherein:
the another volume is a volume that excludes a volume taken up by the transducer assembly.

5. The device of claim 1, wherein:
the another volume is a general unused volume of a main housing of the implantable microphone, the main housing being exposed to body fluids when the implantable microphone is implanted in a human and establishing part of a hermetic barrier of the implantable microphone.

6. The device of claim 1, wherein:
the front volume, the another volume and the route are sized and dimensioned and configured to equalize a pressure imbalance between the front volume and the another volume of 20% relative to the another volume to less than 5% of the maximum pressure imbalance within 30 minutes from the maximum pressure imbalance.

7. The device of claim 1, wherein:
the pressure equalization is achieved via gas transfer between the front volume and the another volume through the route, wherein an element retards the gas transfer; and
the microphone would not work in the absence of the element, all else being equal.

8. A device, comprising:
a transducer assembly; and
a chamber in which a gas is located such that vibrations originating external to the device based on sound are effectively transmitted therethrough, wherein
the device is an implantable microphone,
the transducer assembly is in effective vibration communication with the gas, wherein the transducer is configured to convert the vibrations traveling via the gas into an electrical signal,
the chamber and the transducer assembly are part of a microphone system of the implantable microphone, wherein the chamber corresponds to a front volume of the microphone system, and the transducer assembly includes a back volume corresponding to at least part of a back volume of the microphone system, and
the device is configured to transfer gas between the chamber and a volume outside the transducer assembly, the volume outside the transducer assembly being a fixed volume.

9. The device of claim 8, wherein:
the device is configured to passively transfer gas between the chamber and a volume outside the transducer assembly.

10. The device of claim 8, wherein:
the volume outside the transducer assembly is established by a main housing of the implantable microphone that envelopes the front volume and the transducer assembly.

11. The device of claim 8, wherein:
the back volume is completely fluidically isolated from volume outside the transducer assembly beyond a fluid transfer route extending directly between the back volume and the front volume, if present.

12. The device of claim 8, wherein:
the transducer assembly includes a diaphragm that receives vibrations traveling via gas of the front volume, the transducer assembly configured to convert movement of the diaphragm of the transducer to an output signal; and
other than a change due to movement of the diaphragm of the transducer, the volumetric size of the back volume is fixed.

13. The device of claim 8, wherein:
the device is configured to transfer gas between the chamber and the volume outside the transducer assembly through a path with a porous component that significantly slows the transfer relative to that which would be the case in the absence of the porous component, all else equal.

14. The device of claim 8, wherein:
the device is configured to transfer gas between the chamber and the volume outside the transducer assembly through a path with a porous component that slows the transfer by at least 10 times relative to that which would be the case in the absence of the porous component, all else equal.

15. A method, comprising:
capturing at a first temporal location first sound originating external to a recipient with an implanted microphone system implanted in the recipient while the implanted microphone system has a first transfer function;
subsequent to the first temporal location, at a second temporal location, experiencing a first event that causes the first transfer function to change to a second transfer function different from the first transfer function; and
during a first temporal period beginning after the first temporal location, while continuing to experience the first event, automatically changing the transfer function of the microphone system at least back towards the first transfer function by transferring gas between a front volume of the microphone system and another volume that is greater than the back volume of the discrete transducer assembly and at least 5 times greater than the front volume.

16. The method of claim 15, wherein:
the another volume is at least 10 times greater than the front volume.

17. The method of claim 15, wherein:
the transferring of gas is executed by passive transfer between the front volume and the another volume bypassing a back volume of the microphone system.

18. The method of claim 15, wherein:
the transferring of gas is executed by passive transfer between the front volume and the another volume by transferring gas through the back volume of the microphone system.

19. The method of claim 15, wherein:
sound is captured during the first temporal period, the sound capture causing a diaphragm of a transducer of the microphone system to vibrate; and
with the exception, if present, of a path into the transducer through the diaphragm, the another volume is fluidically isolated from a back volume of the microphone system.

20. The method of claim 15, wherein:
the action of transferring gas between the front volume and the another volume is executed by transferring gas through an element that slows the gas transfer by at least 20 times relative to that which would be the case without the use of the element, all else being equal.

* * * * *